United States Patent
Li et al.

(10) Patent No.: US 11,274,196 B2
(45) Date of Patent: Mar. 15, 2022

(54) POLYETHYLENE COMPOSITIONS AND FILMS PREPARED THEREFROM

(71) Applicant: ExxonMobil Chemical Patents Inc., Baytown, TX (US)

(72) Inventors: Dongming Li, Houston, TX (US); Ching-Tai Lue, Sugarland, TX (US); Adriana S. Silva, Houston, TX (US); Matthew W. Holtcamp, Huffman, TX (US); Laughlin G. McCullough, League City, TX (US); David F. Sanders, Beaumont, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 3 days.

(21) Appl. No.: 16/632,177

(22) PCT Filed: Jun. 22, 2018

(86) PCT No.: PCT/US2018/039081
§ 371 (c)(1),
(2) Date: Jan. 17, 2020

(87) PCT Pub. No.: WO2019/027587
PCT Pub. Date: Feb. 7, 2019

(65) Prior Publication Data
US 2020/0231790 A1 Jul. 23, 2020

Related U.S. Application Data

(60) Provisional application No. 62/541,372, filed on Aug. 4, 2017, provisional application No. 62/541,360, filed on Aug. 4, 2017.

(51) Int. Cl.
| | | |
|---|---|---|
| C08L 23/08 | (2006.01) | |
| C08F 4/653 | (2006.01) | |
| C08F 4/6592 | (2006.01) | |
| C08F 210/16 | (2006.01) | |
| C08F 4/659 | (2006.01) | |
| C08F 210/02 | (2006.01) | |
| C08F 210/04 | (2006.01) | |
| C08F 210/14 | (2006.01) | |
| C08J 5/18 | (2006.01) | |

(52) U.S. Cl.
CPC ...... *C08L 23/0815* (2013.01); *C08F 4/65904* (2013.01); *C08F 4/65925* (2013.01); *C08F 4/65927* (2013.01); *C08F 210/02* (2013.01); *C08F 210/04* (2013.01); *C08F 210/14* (2013.01); *C08J 5/18* (2013.01); *C08J 2323/08* (2013.01); *C08L 2203/16* (2013.01); *C08L 2314/06* (2013.01)

(58) Field of Classification Search
CPC .............. C08L 23/8015; C08F 4/65904; C08F 4/65925; C08F 210/16
See application file for complete search history.

(56) References Cited

U.S. PATENT DOCUMENTS

| | | |
|---|---|---|
| 6,180,736 B1 | 1/2001 | Muhle et al. |
| 6,537,943 B1 | 3/2003 | Fritze et al. |
| 7,119,153 B2 | 10/2006 | Jensen et al. |
| 9,850,332 B2* | 12/2017 | Lue .................... B32B 27/32 |
| 10,494,462 B2 | 12/2019 | Kuhlman |
| 10,611,867 B2* | 4/2020 | Holtcamp ............ B32B 27/327 |
| 10,717,790 B2 | 7/2020 | Ye et al. |
| 10,927,202 B2* | 2/2021 | Lue ......................... C08J 5/18 |
| 10,934,376 B2* | 3/2021 | Li ............................ C08J 5/18 |
| 2005/0159300 A1 | 7/2005 | Jensen et al. |
| 2015/0284490 A1 | 10/2015 | Nagy et al. |
| 2016/0347888 A1 | 12/2016 | Lue et al. |

OTHER PUBLICATIONS

Mori, S. et al (1999) "Size Exclusion Chromatography", Appendix I, Springer Berlin Heidelberg.
Siedle, A. R. et al. (1995) "Stereochemical Nonrigidity in Metallocenium Ions," Jrnl. of Organ Chem., v. 497, pp. 119-125.
Davies, Michael J. et al. (2006) "Studies on 1,2-phenylenedioxoborylcyclopentadienes and Some of Their Metal (Ti, Zr, Fe) Complexes," Polyhedron, v. 25, pp. 397-405.
Broussier, Roland et al. (1999) "Group 4 and Group 8 Unbridged Metallocene Derivatives with a Pendant Fluorenyl Group. X-Ray Structure of 1,1'-bis[2-(2-fluorenyl)propyl]ferrocene," Jrnl. of Organ. Chem., v. 574, pp. 267-275.

* cited by examiner

Primary Examiner — Caixia Lu
(74) Attorney, Agent, or Firm — ExxonMobil Chemical Patents Inc.—Law Department

(57) ABSTRACT

A polyethylene composition comprising from about 0.5 to about 20 wt % of alpha-olefin derived units other than ethylene-derived units, with the balance including ethylene-derived units, total internal unsaturations (Vy1+Vy2+T1) of from about 0.10 to about 0.40 per 1000 carbon atoms, an MI of from about 0.1 to about 6 g/10 min, an HLMI of from about 5.0 to about 40 g/10 min, a density of from about 0.890 to about 0.940 g/ml, a $Tw_1-Tw_2$ value of from about −25 to about −20° C., an $Mw_1/Mw_2$ value of from about 1.2 to about 2.0, an Mw/Mn of from about 4.5 to about 12, an Mz/Mw of from about 2.0 to about 3.0, an Mz/Mn of from about 7.0 to about 20, and a $g'_{(vis)}$ greater than 0.90.

25 Claims, 4 Drawing Sheets

POLYETHYLENE COMPOSITIONS AND FILMS PREPARED THEREFROM

CROSS-REFERENCE OF RELATED APPLICATIONS

This application is a national state filing of Patent Cooperation Treaty Application No. PCT/US2018/039081, which claims the benefit of Ser. No. 62/541,372, filed Aug. 4, 2017, and Ser. No. 62/541,360 filed Aug. 4, 2017, the disclosures of which are hereby incorporated by reference in their entireties.

FIELD OF INVENTION

This application relates to polyethylene compositions having unique characteristics, which characteristics give rise to films having an advantageous balance of toughness, stiffness, processability, and optical qualities.

BACKGROUND OF INVENTION

Ethylene alpha-olefin (polyethylene) copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

A number of catalyst compositions containing single site, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts often produce polyethylene copolymers that have a narrow molecular weight distribution. Although there are single site catalysts that can produce broader molecular weight distributions, these catalysts often show a narrowing of the molecular weight distribution as the reaction temperature is increased, for example, to increase production rates. Further, a single site catalyst will often incorporate comonomer among the molecules of the polyethylene copolymer at a relatively uniform rate. The molecular weight distribution (MWD) and the amount of comonomer incorporation can be used to determine a SCBD.

For an ethylene alpha-olefin copolymer, short chain branching (SCB) on a polymer chain is typically created through comonomer incorporation during polymerization. Short chain branch distribution (SCBD) refers to the distribution of short chain branches within a molecule or among different molecules that comprise the polyethylene polymer. When the amount of SCB varies among the polyethylene molecules, the resin is said to have a "broad" SCBD. When the amount of SCB is similar among the polyethylene molecules of different chain lengths, the SCBD is said to be "narrow."

SCBD is known to influence the properties of copolymers, for example, stiffness, toughness, extractable content, environmental stress crack resistance, and heat sealing, among other properties. SCBD of a polyolefin may be readily measured by methods known in the art, for example, Temperature Raising Elution Fractionation (TREF) or Crystallization Analysis Fractionation (CRYSTAF).

It is generally known in the art that a polyolefin's MWD and SCBD is largely dictated by the type of catalyst used and is often invariable for a given catalyst system. Ziegler-Nana catalysts and chromium based catalysts produce polymers with broad SCBD, whereas metallocene catalysts normally produce polymers with narrow SCBD. It has been long observed in the industry that there are trade-off paradigms among the different product attributes; most noticeably among stiffness, toughness, and processability (S/T/P). Since the introduction of metallocene in 1990s, some of such paradigms have been relaxed significantly with careful manipulations of molecular structure and composition in the product.

Polymers having a broad orthogonal composition distribution (BOCD) in which the comonomer is incorporated preferentially in the high molecular weight chains can lead to improved physical properties, for example, stiffness, toughness, processability, and environmental stress crack resistance (ESCR), among others. Because of the improved physical properties of polymers with orthogonal composition distributions needed for commercially desirable products, there exists a need for controlled techniques for forming polyethylene copolymers having a broad orthogonal composition distribution.

It is therefore sought to provide ethylene polymers having the unique properties of high stiffness, high toughness and good optical properties.

SUMMARY OF INVENTION

In one aspect, a polyethylene composition is provided that comprises a plurality of polymeric molecules, where each molecule includes ethylene-derived units and optionally alpha-olefin derived units other than ethylene-derived units, said polyethylene composition being characterized by including from about 0.5 to about 20 wt % of alpha-olefin derived units other than ethylene-derived units, with the balance including ethylene-derived units, total internal unsaturations (Vy1+Vy2+T1) of from about 0.10 to about 0.40 per 1000 carbon atoms, an MI of from about 0.1 to about 6 g/10 min, an HLMI of from about 5.0 to about 40 g/10 min, a density of from about 0.890 to about 0.940 g/ml, a $Tw_1$-$Tw_2$ value of from about −25 to about −20° C., an $Mw_1$/$Mw_2$ value of from about 1.2 to about 2.0, an Mw/Mn of from about 4.5 to about 12, an Mz/Mw of from about 2.0 to about 3.0, an Mz/Mn of from about 7.0 to about 20, and a $g'_{(vis)}$ greater than 0.90.

In another aspect, a blown polyethylene film is provided that comprises a polyethylene composition including a plurality of polymeric molecules, where each molecule includes ethylene-derived units and optionally C3 to C12 alpha-olefin derived units, said polyethylene composition being characterized by including from about 0.5 to about 20 wt % of alpha-olefin derived units other than ethylene-derived units, with the balance including ethylene-derived units, total internal unsaturations (Vy1+Vy2+T1) of from about 0.10 to about 0.40 per 1000 carbon atoms, an MI of from about 0.1 to about 6 g/10 min, an HLMI of from about 5.0 to about 40 g/10 min, a density of from about 0.890 to about 0.940 g/ml, a $Tw_1$-$Tw_2$ value of from about −25 to about −20° C., an $Mw_1$/$Mw_2$ value of from about 1.2 to about 2.0, an Mw/Mn of from about 4.5 to about 12, an Mz/Mw of from about 2.0 to about 3.0, an Mz/Mn of from about 7.0 to about 20, and a $g'_{(vis)}$ greater than 0.90, where said blown film is characterized by a Dart Drop Impact (DI) that is greater than 300 g/mil, a haze of less than 30%, and a machine-direction tear resistance that is greater than 120 g/mil.

DETAILED DESCRIPTION OF THE PRESENT INVENTION

Definitions

Figure 1A:
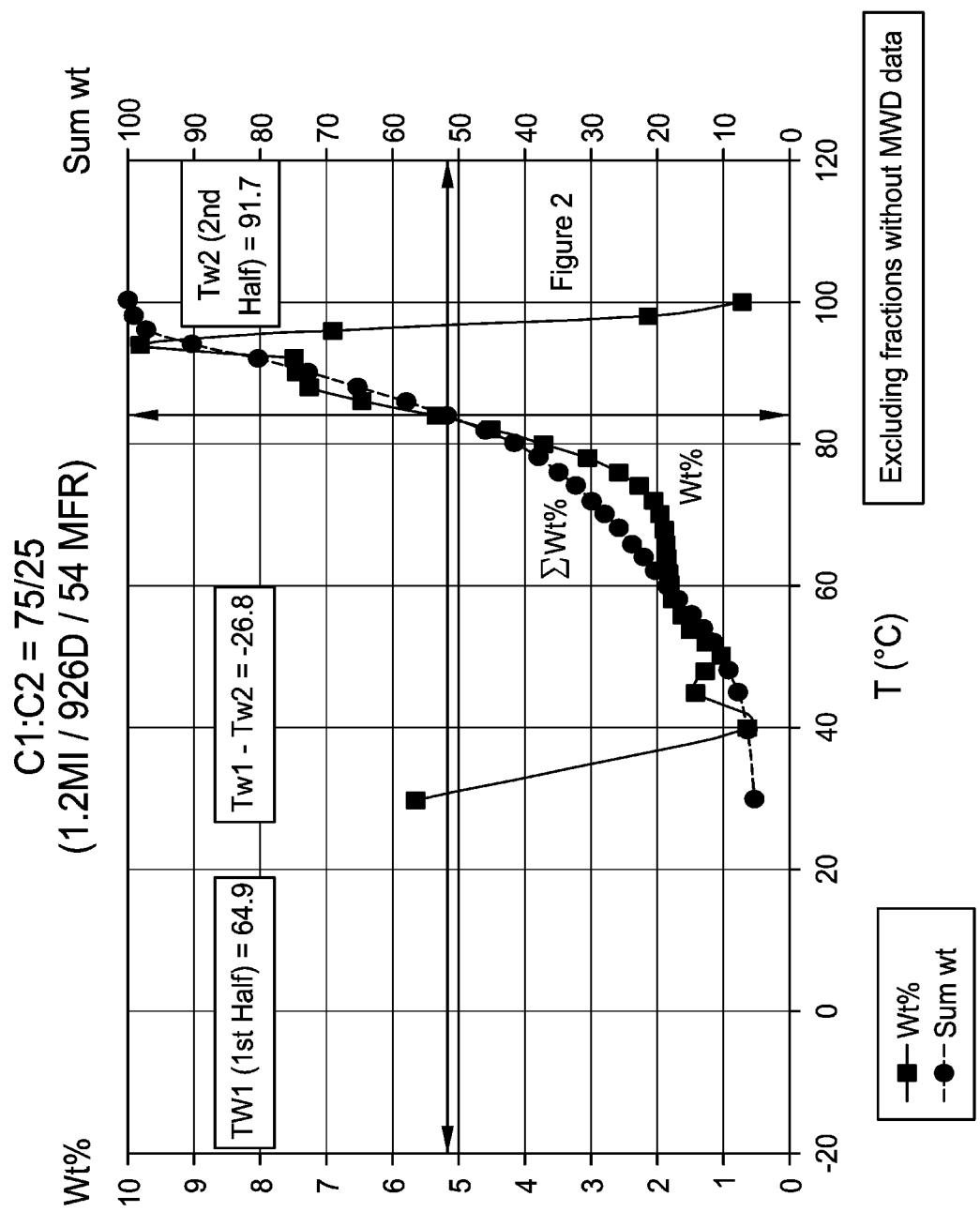
FIGS. 1A and 1B are plots that help illustrate how data from Cross-Fractionation Chromatography was used to define characteristics of the polyethylene compositions.

For purposes of this invention and the claims thereto, a "catalyst system" is a combination of at least two catalyst compounds, an activator, and a support material. The catalyst systems may further comprise one or more additional catalyst compounds. The terms "mixed catalyst system," "dual catalyst system," "mixed catalyst," and "supported catalyst system" may be used interchangeably herein with "catalyst system." For the purposes of this invention and the claims thereto, when catalyst systems are described as comprising neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group," "radical," and "substituent" are also used interchangeably in this document. For purposes of this invention, "hydrocarbyl radical" is defined to be $C_1$-$C_{100}$ radicals, that may be linear, branched, or cyclic, and when cyclic, aromatic or non-aromatic.

For purposes of this invention and claims thereto, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like (where R* is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably, N, O, or S.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of this invention and the claims thereto, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

Polyethylene in an overlapping density range, i.e., 0.890 to 0.930 g/cm$^3$, typically from 0.915 to 0.930 g/cm$^3$, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is measured by GPC-4D as described below.

For the purposes of this invention, ethylene shall be considered an α-olefin.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be Mw divided by Mn. Unless otherwise noted, all molecular weights (e.g., Mw, Mn, Mz) are reported in units of g/mol. The following abbreviations may be used herein: Me is methyl, Et is ethyl, t-Bu and $^t$Bu are tertiary butyl, iPr and $^i$Pr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylaluminoxane.

Introduction

Embodiments of the invention are based, at least in part, on the discovery of polyethylene compositions that are useful for preparing improved polymeric films that demonstrate a desirable balance of properties such as stiffness, toughness, processability, and optical properties. And, it has been discovered that these advantageous film properties are linked, at least in part, to certain characteristics of the polyethylene composition. Moreover, it has unexpectedly been discovered that these characteristics serve to distinguish these polyethylene compositions from those polyethylene compositions that do not give rise to films with the advantageous properties. Accordingly, embodiments of the invention are directed toward novel polyethylene compositions having specific characteristics and films prepared from these polyethylene compositions.

Characteristics of Composition

Comonomer Content

The polyethylene compositions of the present invention include a plurality of polyethylene polymeric molecules that include at least one of polyethylene homopolymer and polyethylene copolymers, which are copolymers including ethylene-derived units and alpha-olefin-derived. In other words, the polyethylene copolymers are prepared from the polymerization of ethylene and at least one alpha-olefin monomer other than ethylene. Unless otherwise stated, the term polyethylene composition will refer to a composition including at least one of a polyethylene homopolymer and a polyethylene copolymer. In particular embodiments, the composition includes both a polyethylene homopolymer and a polyethylene copolymer.

For purposes of this specification, alpha-olefin monomer other than ethylene may be referred to as C3 (i.e. propene) or higher alpha-olefin. In particular embodiments, the alpha-olefin includes a C3 to C12 alpha-olefin. In one or more embodiments, the alpha-olefin monomer other than ethylene includes, but is not limited to, propylene, butene, hexene, octene, decene, and dodecene. In particular embodiments, the polyethylene copolymers are prepared from the polymerization of ethylene and butene, in other embodiments ethylene and hexane, and in other embodiments ethylene and octene.

According to embodiments of the present invention, the polyethylene compositions may be characterized by the amount of alpha-olefin-derived units, other than ethylene-derived units, within the composition. As the skilled person will appreciate, the amount of alpha-olefin-derived units (i.e. non-ethylene units) can be determined by 4D GPC analysis, which analysis is described herein.

In one or more embodiments, the polyethylene compositions may include greater than 0.5, in other embodiments greater than 1, and in other embodiments greater than 3 mole % alpha-olefin-derived units other than ethylene-derived units, with the balance including ethylene-derived units. In these or other embodiments, the polyethylene compositions may include less than 20, in other embodiments less than 15, in other embodiments less than 10, and in other embodiments less than 7 mole % alpha-olefin-derived units other than ethylene-derived units, with the balance including ethylene-derived units. In one or more embodiments, the polyethylene composition of the present invention may include from about 0.5 to 20 mole %, in other embodiments from 1 to 15 mole %, and in other embodiments from 3 to 10 mole % alpha-olefin-derived units other than ethylene-derived units, with the balance including ethylene-derived units.

Internal Unsaturation

The polyethylene compositions of the present invention may be characterized by their level of internal unsaturation structures. Internal (I) and terminal (T) unsaturation can be determined by employing the techniques described in U.S. Publication No. 2017/0114167, which is incorporated herein by reference. Specifically, unsaturations in a polymer are determined by $^1$H NMR with reference to Macromolecules 2014, 47, 3782 and Macromolecules 2005, 38, 6988, but in event of conflict, Macromolecules 2014, 47, 3782 shall control. Peak assignments are determined referencing the solvent of tetrachloroethane-1,2 d$_2$ at 5.98 ppm. The labels "Vy1", "Vy2" and "Vy5" refer to proton resonances attributed to the protons on double bonds within the polymer backbone. Internal unsaturations include unsaturation assigned to peaks Vy1 and Vy2, which represent unsaturation without carbon substitution, and T1, which represents tri-substituted olefins or, stated another way, unsaturation with carbon substitution. $^1$H NMR data is typically collected at 393K in a 10 mm probe using a Bruker spectrometer with a $^1$H frequency of at least 400 MHz (available from Agilent Technologies, Santa Clara, Calif.). Data can be recorded using a maximum pulse width of 45° C., 5 seconds between pulses and signal averaging 512 transients. Spectral signals are integrated and the number of unsaturation types per 1000 carbons calculated by multiplying the different groups by 1000 and dividing the result by the total number of carbons. The number average molecular weight (Mn) was calculated by dividing the total number of unsaturated species into 14,000, and has units of g/mol.

In one or more embodiments, the polyethylene compositions may include greater than 0.10, in other embodiments greater than 0.18, and in other embodiments greater than 0.20 total internal unsaturations (i.e. Vy1+Vy2+T1) per 1000 carbon atoms. In these or other embodiments, the polyethylene compositions may include less than 0.40, in other embodiments less than 0.30, in other embodiments less than 0.25 total internal unsaturations per 1000 carbon atoms. In one or more embodiments, the polyethylene composition of the present invention may include from about 0.10 to 0.40, in other embodiments from 0.18 to 0.30, and in other embodiments from 0.20 to 0.25 total internal unsaturations per 1000 carbon atoms.

In one or more embodiments, the polyethylene compositions may include greater than 0.08, in other embodiments greater than 0.12, and in other embodiments greater than 0.15 tri-substituted olefins (i.e. T1) per 1000 carbon atoms. In these or other embodiments, the polyethylene compositions may include less than 0.35, in other embodiments less than 0.25, in other embodiments less than 0.23 tri-substituted olefins per 1000 carbon atoms. In one or more embodiments, the polyethylene composition of the present invention may include from about 0.08 to 0.35, in other embodiments from 0.12 to 0.25, and in other embodiments from 0.15 to 0.23 tri-substituted olefins per 1000 carbon atoms.

In one or more embodiments, the polyethylene compositions may include greater than 0.02, in other embodiments greater than 0.04, and in other embodiments greater than 0.05 unsaturations without carbon substitution (i.e. Vy1+Vy2) per 1000 carbon atoms. In these or other embodiments, the polyethylene compositions may include less than 0.10, in other embodiments less than 0.08, in other embodiments less than 0.06 unsaturations without carbon substitution per 1000 carbon atoms. In one or more embodiments, the polyethylene composition of the present invention may include from about 0.02 to 0.10, in other embodiments from 0.04 to 0.08, and in other embodiments from 0.05 to 0.06 unsaturations without carbon substitution per 1000 carbon atoms.

Density

The polyethylene compositions of the present invention may be characterized by their density, which is determined according to ASTM D 1505 using a density-gradient column on a samples molded according to ASTM D 4703-10a, Procedure C, and then conditioned under ASTM D 618-08 (23°±2° C. and 50±10% relative humidity) for 40 hours prior to testing. According to embodiments of the present invention, the polyethylene compositions may have a density of greater than 0.890, in other embodiments greater than 0.900, and in other embodiments greater than 0.914 g/ml. In these or other embodiments, the polyethylene compositions may have a density of less than 0.940, in other embodiments less than 0.930, and in other embodiments less than 0.925 g/ml. In particular embodiments, the polyethylene compositions have a density from 0.890 to 0.940, in other embodiments from 0.900 to 0.920, in other embodiments from 0.912 to 0.917, in other embodiments from 0.918 to 0.928, and in other embodiments from 0.914 to 0.917.

Melt Index

The polyethylene compositions of the present invention may be characterized by their melt index (MI), which may also be referred to as I2, reported in g/10 min, as determined according to ASTM D1238, 190° C., 2.16 kg load. According to embodiments of the present invention, the polyethylene compositions may have a MI of greater than 0.1, in other embodiments greater than 0.3, and in other embodiments greater than 0.5 g/10 min. In these or other embodiments, the polyethylene compositions may have a MI of less than 6.0, in other embodiments less than 5.0, and in other embodiments less than 4.0 g/10 min. In one or more embodiments, the polyethylene compositions have a MI of from about 0.1 to about 6.0, in other embodiments from about 0.3 to about 5.0, and in other embodiments from about 0.5 to about 4.0 g/10 min.

The polyethylene compositions of the present invention may be characterized by their high load melt index (HLMI), which may also be referred to as I21, reported in g/10 min, as determined according to ASTM D1238, 190° C., 21.6 kg load. According to embodiments of the present invention, the polyethylene compositions may have a HLMI of greater than 5.0, in other embodiments greater than 7.0, and in other embodiments greater than 10 g/10 min. In these or other embodiments, the polyethylene compositions may have a HLMI of less than 40, in other embodiments less than 35, and in other embodiments less than 30 g/10 min. In one or more embodiments, the polyethylene compositions have a HLMI of from about 5.0 to about 40, in other embodiments from about 7.0 to about 35, and in other embodiments from about 10 to about 30 g/10 min.

The polyethylene compositions of the present invention may be characterized by their Melt index ratio (MIR) or HLMI/MI ratio, which is HLMI divided by MI, both of which are determined by ASTM D1238. According to embodiments of the present invention, the polyethylene compositions may have a MIR of greater than 20, in other embodiments greater than 23, and in other embodiments greater than 25. In these or other embodiments, the polyethylene compositions may have a MIR of less than 40, in other embodiments less than 37, and in other embodiments less than 35. In one or more embodiments, the polyethylene compositions have a MIR of from about 20 to about 40, in other embodiments from about 23 to about 37, and in other embodiments from about 25 to about 35.

GPC 4D Methodology

Unless otherwise indicated, the distribution and the moments of molecular weight (Mw, Mn, Mz, Mw/Mn, etc.), the comonomer content (C2, C3, C6, etc.), and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-4 flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS},$$

where the variables with subscript "PS" stand for polystyrene while those without a subscript are for the test samples. In this method, $\alpha_{PS}=0.67$ and $K_{PS}=0.000175$, while a and K for other materials are as calculated and published in literature (Sun, T. et al. *Macromolecules* 2001, 34, 6812), except that for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$w2=f*SCB/1000\ TC.$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of }CH_3\text{ signal within integration limits}}{\text{Area of }CH_2\text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $w2b=f*\text{bulk }CH3/1000\ TC$ bulk SCB/1000 TC=bulk CH3/1000 TC−bulk CH3end/1000 TC, and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as $$g'_{vis} = \frac{[\eta]_{avg}}{KM_V^\alpha},$$

where $M_V$ is the viscosity-average molecular weight based on molecular weights determined by LS analysis and the K and $\alpha$ are for the reference linear polymer, which are, for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and $K$ is $0.000579*(1-0.0087*w2b+0.000018*(w2b)^2)$ for ethylene-butene copolymer where w2b is a bulk weight percent of butene comonomer, $\alpha$ is 0.695 and $K$ is $0.000579*(1-0.0075*w2b)$ for ethylene-hexene copolymer where w2b is a bulk weight percent of hexene comonomer, and $\alpha$ is 0.695 and $K$ is $0.000579*(1-0.0077*w2b)$ for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer C3, C4, C6, C8, etc.), as a function of molecular weight, where x2 is obtained from the following expression in which n is the number of carbon atoms in the comonomer (3 for C3, 4 for C4, 6 for C6, etc.):

$$x2 = -\frac{200w2}{-100n - 2w2 + nw2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W'dz$$

and a modified weight-average molecular weight ($M_w'$) is calculated over the effectively reduced range of molecular weights as follows:

$$M_w' = \int_{-\infty}^{\infty} 10^z * W'dz.$$

The RCI,m is then computed as $$RCI, m = \int_{-\infty}^{\infty} x2(10^z - M_w')W'dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^Z - M_w')W'dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

-continued $$CDR\text{-}2, w = \frac{w2(Mz)}{w2\left(\frac{Mw+Mn}{2}\right)},$$

$$CDR\text{-}3 = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw+Mn}{2}\right)},$$

$$CDR\text{-}3 = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average (Mw) unless otherwise noted. All molecular weights are reported in g/mol unless otherwise noted.

Molecular Weight

The polyethylene compositions of the present invention may be characterized by their number average molecular weight (Mn), which may be measured by using the technique set forth above. According to embodiments of the present invention, the polyethylene compositions may have a Mn of greater than 10,000, in other embodiments greater than 12,000, and in other embodiments greater than 15,000 g/mol. In these or other embodiments, the polyethylene compositions may have a Mn of less than 100,000, in other embodiments less than 80,000, and in other embodiments less than 60,000 g/mol. In one or more embodiments, the polyethylene compositions have a Mn of from about 10,000 to about 100,000, in other embodiments from about 12,000 to about 80,000, and in other embodiments from about 15,000 to about 60,000 g/mol.

The polyethylene compositions of the present invention may be characterized by their number average molecular weight (Mw), which may be measured by using the technique set forth above. According to embodiments of the present invention, the polyethylene compositions may have a Mw of greater than 80,000, in other embodiments greater than 90,000, and in other embodiments greater than 100,000 g/mol. In these or other embodiments, the polyethylene compositions may have a Mw of less than 250,000, in other embodiments less than 200,000, and in other embodiments less than 180,000 g/mol. In one or more embodiments, the polyethylene compositions have a Mw of from about 80,000 to about 250,000, in other embodiments from about 90,000 to about 200,000, and in other embodiments from about 100,000 to about 180,000 g/mol.

The polyethylene compositions of the present invention may be characterized by their z-average molecular weight (Mz), which may be measured by using the technique set forth above. According to embodiments of the present invention, the polyethylene compositions may have an Mz of greater than 210,000, in other embodiments greater than 250,000, and in other embodiments greater than 275,000 g/mol. In these or other embodiments, the polyethylene compositions may have an Mz of less than 500,000, in other embodiments less than 450,000, and in other embodiments less than 400,000 g/mol. In one or more embodiments, the polyethylene compositions have an Mz of from about 210,000 to about 500,000, in other embodiments from about 250,000 to about 450,000, and in other embodiments from about 275,000 to about 400,000 g/mol.

The polyethylene compositions of the present invention may be characterized by their molecular weight distribution (Mw/Mn), which may also be referred to as polydispersity, where Mw and Mn may be measured by using the technique set forth above. According to embodiments of the present invention, the polyethylene compositions may have an Mw/Mn of greater than 4.5, in other embodiments greater than 4.7, and in other embodiments greater than 4.9. In these or other embodiments, the polyethylene compositions may have an Mw/Mn of less than 12, in other embodiments less than 11, and in other embodiments less than 9.5. In one or more embodiments, the polyethylene compositions have an Mw/Mn of from about 4.5 to about 12, in other embodiments from about 4.7 to about 12, and in other embodiments from about 4.9 to about 9.5.

The polyethylene compositions of the present invention may be characterized by their ratio of z-average molecular weight to weight average molecular weight (Mz/Mw), where Mz and Mw may be measured by using the technique set forth above. According to embodiments of the present invention, the polyethylene compositions may have an Mz/Mw of greater than 2.0, in other embodiments greater than 2.2, and in other embodiments greater than 2.3. In these or other embodiments, the polyethylene compositions may have an Mz/Mw of less than 3.0, in other embodiments less than 2.9, and in other embodiments less than 2.8. In one or more embodiments, the polyethylene compositions have an Mz/Mw of from about 2.0 to about 3.0, in other embodiments from about 2.2 to about 2.9, and in other embodiments from about 2.3 to about 2.8.

The polyethylene compositions of the present invention may be characterized by their ratio of z-average molecular weight to number average molecular weight (Mz/Mn), where Mz and Mn may be measured by using the technique set forth above. According to embodiments of the present invention, the polyethylene compositions may have an Mz/Mn of greater than 7.0, in other embodiments greater than 10, and in other embodiments greater than 11. In these or other embodiments, the polyethylene compositions may have an Mz/Mn of less than 20, in other embodiments less than 18, and in other embodiments less than 17. In one or more embodiments, the polyethylene compositions have an Mz/Mw of from about 7.0 to about 20, in other embodiments from about 10 to about 18, and in other embodiments from about 11 to about 17.

Branching Index

The polyethylene compositions of the present invention may be characterized by their branching index $g'_{(vis)}$, which may be calculated by using the technique set forth above. Generally, the polyethylene composition of the present invention are substantially free of long-chain branching, which polymer compositions are characterized by a $g'_{(vis)}$ proximate to 1.0. According to embodiments of the present invention, the polyethylene compositions of the invention may have a $g'_{(vis)}$ of greater than 0.90, in other embodiments greater than 0.92, in other embodiments greater than 0.94, and in other embodiments greater than 0.96.

Reversed-Co-Monomer Index

The polyethylene compositions of the present invention may be characterized by their reversed-co-monomer index (RCI,m), which may be calculated by using the technique set forth above. According to embodiments of the present invention, the polyethylene compositions may have a RCI,m of greater than 35, in other embodiments greater than 55, and in other embodiments greater than 70 kg/mol. In these or other embodiments, the polyethylene compositions may have a RCI,m of less than 190, in other embodiments less than 160, and in other embodiments less than 140 kg/mol. In one or more embodiments, the polyethylene compositions have a RCI,m of from about 35 to about 190, in other embodiments from about 55 to about 165, and in other embodiments from about 70 to about 140 kg/mol.

Comonomer Distribution Ratio

The polyethylene compositions of the present invention may be characterized by their comonomer distribution ratio-2 (CDR-2,m), which may be calculated by using the technique set forth above. According to embodiments of the present invention, the polyethylene compositions may have a CDR-2,m of greater than 1.20, in other embodiments greater than 1.30, and in other embodiments greater than 1.40. In these or other embodiments, the polyethylene compositions may have a CDR-2,m of less than 1.80, in other embodiments less than 1.70, and in other embodiments less than 1.60. In one or more embodiments, the polyethylene compositions have a CDR-2,m of from about 1.20 to about 1.80, in other embodiments from about 1.30 to about 1.70, and in other embodiments from about 1.40 to about 1.60.

Temperature Rising Elution Fractionation (TREF)

Figure 3:
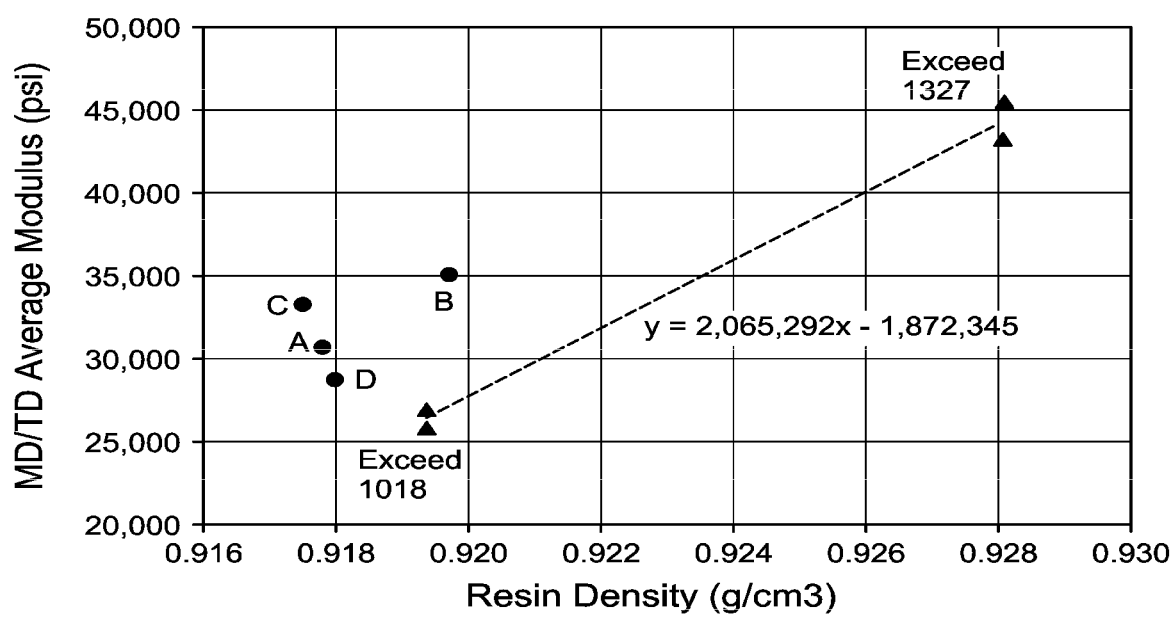
FIG. 3 is a graphical representation of Average Film modulus as a function of Resin Density for films prepared from various polyethylene compositions.

Temperature Rising Elution Fractionation (TREF) analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. Anal. Bioanal. Chem. 2011, 399, 1557. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg but as low as approximately 10 mg) is dissolved in ODCB (25 ml metered at ambient temperature) by stirring at 150° C. for 60 min. A small volume (0.5 ml) of the solution is introduced into a column (15-cm long by ⅜" o.d.) packed with an inert support (of stainless steel balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min before injecting the ODCB flow (1 ml/min) into the column for 10 min to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30° C. to 140° C. at a rate of 2° C./min while maintaining the ODCB flow at 1 ml/min to elute and measure the dissolving polymer.

The polyethylene compositions of the present invention have two peaks in the TREF measurement, which is described below. Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. In other embodiments, the two distinct peaks are at least 3° C. apart, in other embodiments at least 4° C. apart, and in other embodiments at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement then can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491-499 (1994).

The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Composition Distribution Breadth ($T_{75}$-$T_{25}$)

The polyethylene compositions of one or more embodiments of the present invention are characterized by a composition distribution breadth $T_{75}$-$T_{25}$, as measured by TREF, of greater than 10° C., in other embodiments greater than 15° C., and in other embodiments greater than 18° C. In these or other embodiments, the polyethylene compositions of the present invention are characterized by a composition distribution breadth $T_{75}$-$T_{25}$, as measured by TREF, of less than 35° C., in other embodiments less than 27° C., and in other embodiments less than 22° C. In one or more embodiments, particularly those polyethylene compositions having a density of 0.912 to 0.917, the polyethylene compositions of this invention have a composition distribution breadth $T_{75}$-$T_{25}$, as measured by TREF, of from about 10 to about 35° C., in other embodiments from about 15 to about 27° C., and in other embodiments from about 18 to about 22° C.

Cross-Fractionation Chromatography (CFC)

Cross-fractionation chromatography (CFC) analysis is done using a CFC-2 instrument from Polymer Char, S.A., Valencia, Spain. The principles of CFC analysis and a general description of the particular apparatus used are given in the article by Ortin, A.; Monrabal, B.; Sancho-Tello, 257 J. MACROMOL. SYMP. 13 (2007). In FIG. 1 of the article is an appropriate schematic of the particular apparatus used. Pertinent details of the analysis method and features of the apparatus used are as follows.

The solvent used for preparing the sample solution and for elution was 1,2-Dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 μm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages (Mn, Mw, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography*; Springer, 1999. For polystyrene K=1.38×10$^{-4}$ dl/g and α=0.7; and for polyethylene K=5.05×10$^4$ dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

Measuring $Tw_1$, $Tw_2$, $Mw_1$ and $Mw_2$ from CFC

The techniques and calculations to determine $Tw_1$, $Tw_2$, $Mw_1$, and $Mw_2$ from CFC data are described in U.S. Publication No. 2016/0347888, which is incorporated herein by reference. CFC data reported from the instrument software CFC-2 instrument) includes "Fraction Summary" where each fraction is listed by its fractionation temperature (Ti), the corresponding normalized weight % value (Wi), the cumulative weight %, and various moments of molecular weight averages (including weight average molecular weight, Mwi). From this data, the temperature at which 100% of the material has eluted, as well as the closest point at which 50% of the polymer has eluted, is determined by the integral, which is used then to divide the fractionations into a $1^{st}$-half and a $2^{nd}$-half.

Figure 1B:
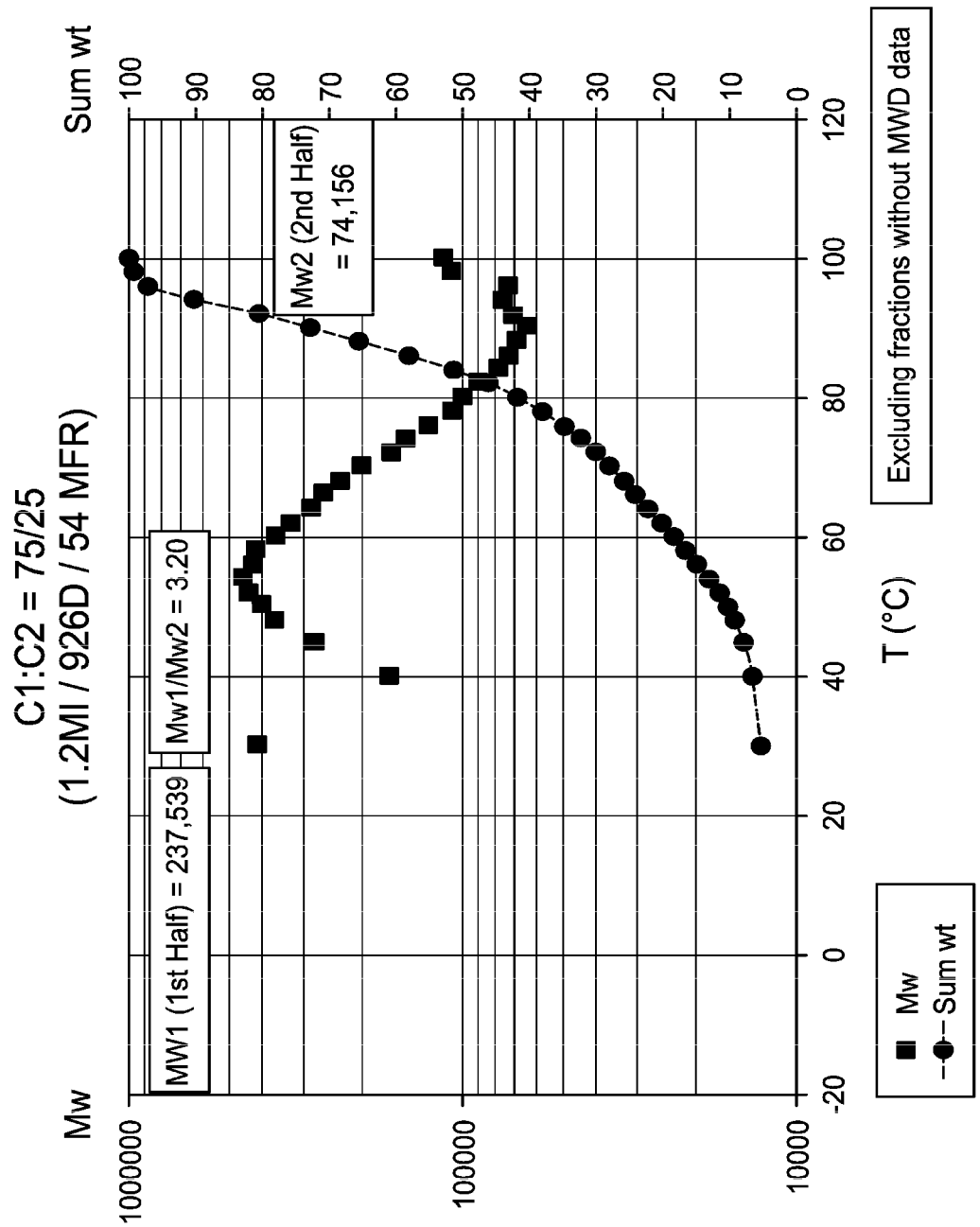

For example, and with reference to FIGS. 1A and 1B, the x-axis represents the elution temperature in centigrade, while the right hand y-axis represents the value of the integral of the weights of polymer that have been eluted up to an elution temperature. The temperature at which 100% of the material has eluted in this example is about 100° C., and the closest point at which 50% of the polymer has eluted is 84° C. Accordingly, the first fraction Ti is less than or equal to 84° C. and the second fraction is greater than 84° C. Fractions without molecular weight averages are excluded, which in this example includes those fractions with Ti between 25 and 40° C.

Once the data is divided into two roughly equal halves, weight averages of Ti and Mwi for each half (i.e. $Tw_1$, $Tw_2$, $Mw_1$ and $Mw_2$) are calculated according to the conventional definition of weight average. Namely, Ti and Mwi are used to calculate the weight average elution temperature for each half using the formula shown in Eqn. 1.

$$Tw = \frac{\Sigma TiWi}{\Sigma Wi}, \qquad \text{Eqn. 1}$$

where Ti represents the elution temperature for each eluted fraction, and Wi represents the normalized weight % (polymer amount) of each eluted fraction. Fractions that did not have sufficient quantity (i.e., <0.5 wt. %) to be processed for molecular weight averages in the original data file are excluded from the calculation of $Tw_1$, $Tw_2$, $Mw_1$ and $Mw_2$.

With reference again to FIG. 1A, the weight average elution temperature is 64.9° C. for the first half and 91.7° C. for the second half.

Similarly, the weight average molecular weight (Mwi) of each eluted fraction is used to calculate the weight average molecular weight for each half using the formula shown in Eqn. 2.

$$Mw = \frac{\Sigma MwiWi}{\Sigma Wi}, \qquad \text{Eqn. 2}$$

where Mw represents the weight average molecular weight of each eluted fraction, and Wi represents the normalized weight % (polymer amount) of each eluted fraction.

With reference again to FIG. 1B, the weight average molecular weight is 237,539 g/mol for the first half and 74,156 g/mol for the second half.

The values calculated using the techniques described above may be used to classify the MWD×SCBD for experimental polymers and control polymers.

Ratio of Molecular Weight of TREF Elution Fractions ($Mw_1/Mw_2$)

The polyethylene compositions of the present invention may be characterized by their ratio of a weight average molecular weight for a first half or fraction (Mw1) of a temperature rising elution (TREF) curve from cross-fractionation (CFC) to a weight average molecular weight for a second half or fraction ($Mw_2$) of the TREF curve, where $Mw_1$ and $Mw_2$ may be calculated by using the technique set forth above. According to embodiments of the present invention, the polyethylene compositions may be characterized by a ratio $Mw_1/Mw_2$ of greater than 1.2, in other embodiments greater than 1.35, and in other embodiments greater than 1.5. In these or other embodiments, the polyethylene compositions may be characterized by a ratio $Mw_1/Mw_2$ of less than 2.0, in other embodiments less than 1.85, and in other embodiments less than 1.80. In one or more embodiments, the polyethylene compositions may be characterized by a ratio $Mw_1/Mw_2$ of from about 1.2 to about 2.0, in other embodiments from about 1.35 to about 1.85, and in other embodiments from about 1.50 to about 1.80.

Difference of Weight Average TREF Elution Temperatures ($Tw_1$-$Tw_2$)

The polyethylene compositions of the present invention may be characterized by their difference of a weight average elution temperature for a first half or fraction ($Tw_1$) of a temperature rising elution (TREF) curve from cross-fractionation (CFC) to a weight average elution temperature for a second half or fraction ($Tw_2$) of the TREF curve, where $Tw_1$ and $Tw_2$ may be calculated by using the technique set forth above. According to embodiments of the present invention, the polyethylene compositions may be characterized by a difference between the first half weight average elution temperature and the second half weight average elution temperature ($Tw_1$-$Tw_2$) of greater than −25° C., in other embodiments greater than −24° C., and in other embodiments greater than −23° C. In these or other embodiments, the polyethylene compositions may be characterized by a $Tw_1$-$Tw_2$ of less than −20° C., in other embodiments less than −20.5° C., and in other embodiments less than −21° C. In one or more embodiments, the polyethylene compositions may be characterized by a $Tw_1$-$Tw_2$ of from about −25.0 to about −20.0° C., in other embodiments from about −24.0 to about −20.5° C., and in other embodiments from about −23.0 to about −21.0° C.

Physical Characteristics of Films

Finished films (e.g. blown films) prepared from the polyethylene compositions of the present invention may be characterized by their 1% Secant modulus, which may be determined according to ASTM D 882 by employing a 15 mm width strip of material. According to embodiments of the present invention, films prepared from polyethylene compositions with a density of 0.914 to 0.917 g/ml may have a 1% Secant modulus, in the transverse direction, of greater than 30,000, in other embodiments greater than 32,000, and in other embodiments greater than 35,000 psi.

According to other embodiments of the present invention, films prepared from polyethylene compositions with a density of 0.918 to 0.921 g/ml may have a 1% Secant modulus, in the transverse direction, of greater than 42,000, in other embodiments greater than 45,000, and in other embodiments greater than 47,000 psi.

Yield Strength

Finished films (e.g. blown films) prepared from the polyethylene compositions of the present invention may be characterized by their yield strength, which may be determined according to ASTM D 882 by employing a 15 mm width strip of material. According to embodiments of the present invention, the polyethylene compositions may have a yield strength, in the transverse direction, of greater than 1400, in other embodiments greater than 1500, and in other embodiments greater than 1600 psi.

Tensile Strength

Finished films (e.g. blown films) prepared from the polyethylene compositions of the present invention may be characterized by their tensile strength, which may be determined according to ASTM D 882 by employing a 15 mm width strip of material. According to embodiments of the present invention, the polyethylene compositions may have a tensile strength, in the transverse direction, of greater than 6500, in other embodiments greater than 7000, and in other embodiments greater than 7200 psi.

Dart Drop

Finished films (e.g. blown films) prepared from the polyethylene compositions of the present invention may be characterized by their impact resistance, which is determined according to Dart F50, or Dart Drop Impact or Dart Impact (DI), which is reported in grams (g) and/or grams per mil (g/mil), as specified by ASTM D-1709, method A, using a dart with a phenolic composite head. According to embodiments of the present invention, the DI of blown polyethylene films of this invention may be greater than 300 g/mil, in other embodiments greater than 400 g/mil, and in other embodiments greater than 500 g/mil.

Puncture

Finished films (e.g. blown films) prepared from the polyethylene compositions of the present invention may be characterized by their puncture resistance, which is determined according to a modified ASTM D 5748 test using two 0.25 mil HDPE slip sheets, and a United SFM-1 testing machine operating at 10 in/min operating with a Btec probe B. According to embodiments of the present invention, the puncture resistance of polyethylene films of this invention may be greater than 22, in other embodiments greater than 23, and in other embodiments greater than 24 in·lbs/mil Haze Finished films prepared from the polyethylene compositions of the present invention may be characterized by their haze, which is quantified in accordance with ASTM D 1003. According to embodiments of the present invention, the haze of the finished polyethylene films of this invention may be less than 30%, in other embodiments less than 20%, in other embodiments less than 15%, and in other embodiments less than 13%. In one or more embodiments, the haze of the finished films may be from about 3 to about 30, in other embodiments from about 5 to about 20, and in other embodiments from about 8 to about 15%.

Gloss

Finished films prepared from the polyethylene compositions of the present invention may be characterized by their gloss at 45°, which is determined in accordance with ASTM D 2457. According to embodiments of the present invention, the gloss at 45° of the finished polyethylene films of this invention may be greater than 6, in other embodiments greater than 8, and in other embodiments greater than 10. In these or other embodiments, the gloss at 45° of the finished films may be less than 22, in other embodiments less than 20, and in other embodiments less than 18. In one or more embodiments, the gloss at 45° of the finished films may be from about 6 to about 22, in other embodiments from about 8 to about 20, and in other embodiments from about 10 to about 18.

Tear

Finished films (e.g. blown films) prepared from the polyethylene compositions of the present invention may be characterized by their tear resistance, which is determined according to Elmendorf Tear pursuant to ASTM D 1922 with samples conditioned at 23°±2° C. and 50±10% relative humidity for 40 hours prior to testing.

According to embodiments of the present invention, the tear resistance of blown polyethylene films of this invention, in the machine direction, may be greater than 120 g/mil, in other embodiments greater than 130 g/mil, and in other embodiments greater than 140 g/mil.

According to embodiments of the present invention, the tear resistance of blown polyethylene films of this invention, in the transverse direction, may be greater than 550 g/mil, in other embodiments greater than 575 g/mil, and in other embodiments greater than 600 g/mil.

Production of Polyethylene Compositions

The polyethylene compositions of the present invention may be prepared by polymerizing olefin monomer by using a supported catalyst system including: (i) a unbridged hafnium metallocene compound; (ii) an unbridged zirconium metallocene compound; (iii) a support material; and (iv) activator. In particular embodiments, the unbridged hafnium metallocene compound is represented by the formula (A):

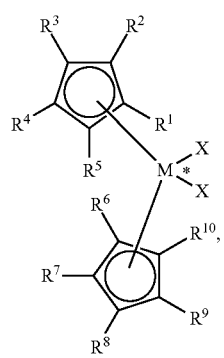

(A)

where

M* is hafnium each of $R^1$, $R^2$, $R^4$ and $R^5$ is independently hydrogen, alkoxide, or $C_1$ to $C_{40}$ substituted or unsubstituted hydrocarbyl;

$R^3$ is —$R^{11}$—$SiR'_3$, where $R^{11}$ is a C1 to C4 hydrocarbyl, and each R' is independently hydrogen or a $C_1$ to $C_{20}$ substituted or unsubstituted hydrocarbyl;

each $R^6$, $R^7$, $R^8$, $R^9$, and $R^{10}$ is independently hydrogen, halide, alkoxide, $C_1$ to $C_{40}$ substituted or unsubstituted hydrocarbyl, or —$R^{11}$—$SiR'_3$, where $R^{11}$ is a $C_1$ to $C_4$ hydrocarbyl, and each R' is independently hydrogen or a $C_1$ to $C_{20}$ substituted or unsubstituted hydrocarbyl; and each X is independently a univalent anionic ligand, or two Xs are joined to form a metallocyclic ring, or two Xs are joined to form a chelating ligand, a diene ligand, or an alkylidene ligand; and the unbridged zirconium metallocene compound is represented formula (B):

$$Cp_mMX_q \qquad (B),$$

wherein each Cp is, independently, a cyclopentadienyl group (such as cyclopentadiene, indene or fluorene) which may be substituted or unsubstituted, M is zirconium, X is a leaving group (such as a halide, a hydride, an alkyl group, an alkenyl group or an arylalkyl group), and m=2 or 3, q=0, 1, 2, or 3, and the sum of m+q is equal to the oxidation state of the hafnium. In some embodiments, m=2 in the metallocene catalyst compound.

As used herein, the term "metallocene compound" includes compounds having two or three Cp ligands (cyclopentadienyl and ligands isolobal to cyclopentadienyl) bound to at least one Zr or Hf metal atom, and one or more leaving group(s) bound to the at least one metal atom.

For purposes of this specification in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this specification and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

Unbridged Hafnium Metallocene

In one or more embodiments, the unbridged hafnium metallocene compound may be represented by the formula (A):

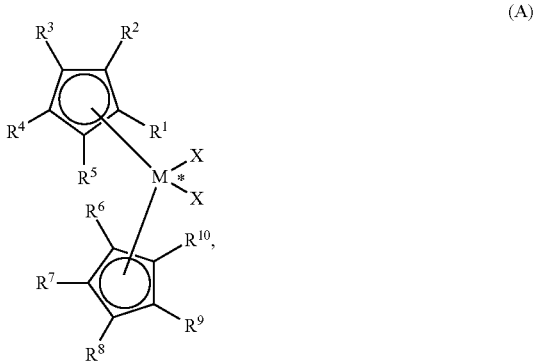

where M* is hafnium; each of $R^1$, $R^2$, $R^4$ and $R^5$ is independently hydrogen, alkoxide, or $C_1$ to $C_{40}$ substituted or unsubstituted hydrocarbyl; $R^3$ is —$R^{11}$—SiR'3, where $R^{11}$ is a $C_1$ to $C_4$ hydrocarbyl, and each R' is independently hydrogen or a $C_1$ to $C_{20}$ substituted or unsubstituted hydrocarbyl; each $R^6$, $R^7$, $R^8$, $R^9$ and $R^{10}$ is independently hydrogen, halide, alkoxide, $C_1$ to $C_{40}$ substituted or unsubstituted hydrocarbyl, or —$R^{11}$—SiR'3, where $R^{11}$ is a $C_1$ to $C_4$ hydrocarbyl, and each R' is independently hydrogen or a $C_1$ to $C_{20}$ substituted or unsubstituted hydrocarbyl; and each X is independently a univalent anionic ligand, or two Xs are joined to form a metallocyclic ring, or two Xs are joined to form a chelating ligand, a diene ligand, or an alkylidene ligand.

In particular embodiments, each $R^1$, $R^2$, $R^4$ and $R^5$ is independently hydrogen, or a substituted $C_1$ to $C_{20}$ hydrocarbyl group or an unsubstituted $C_1$ to $C_{20}$ hydrocarbyl group, and more particularly each $R^1$, $R^2$, $R^4$ and $R^5$ is independently a $C_1$ to $C_{12}$ alkyl group; for example, each $R^1$, $R^2$, $R^4$ and $R^5$ is independently hydrogen, methyl, ethyl, propyl, butyl, pentyl, hexyl, or an isomer thereof, and in particular embodiments $R^1$, $R^2$, $R^4$ and $R^5$ is independently hydrogen or methyl.

In one or more embodiments, $R^3$ is —$R^{20}$—SiR'3, where $R^{20}$ is a $C_1$ to $C_4$ hydrocarbyl (e.g. $CH_2$; $CH_2CH_2$, (Me)CHCH$_2$, (Me)CH), and each R' is independently hydrogen or a $C_1$ to $C_{20}$ substituted or unsubstituted hydrocarbyl (e.g. a substituted $C_1$ to $C_{12}$ hydrocarbyl group or an unsubstituted $C_1$ to $C_{12}$ hydrocarbyl group); for example, R' is methyl, ethyl, propyl, butyl, pentyl, hexyl, phenyl, biphenyl, or an isomer thereof. In one or more embodiments, R' is a $C_1$ to $C_{20}$ alkyl or aryl, such as methyl, methyl phenyl, phenyl, biphenyl, pentamethylphenyl, tetramethylphenyl, or di-t-butylphenyl. In one or more embodiments, at least one R' is not hydrogen, alternatively two of R' are not hydrogen, alternatively three of R' are not hydrogen.

Alternatively, $R^3$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$SiH(CH_3)_2$, —$CH_2SiPh_3$, —$CH_2$—$Si(CH_3)_2Ph$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, each of $R^1$, $R^2$, $R^3$, and $R^4$ is not hydrogen.

In one or more embodiments, each $R^6$, $R^7$, $R^8$, and $R^{10}$ is independently hydrogen, or a substituted $C_1$ to $C_{20}$ hydrocarbyl group or an unsubstituted $C_1$ to $C_{20}$ hydrocarbyl group, and more particularly each $R^6$, $R^7$, $R^8$ and $R^{10}$ is independently a $C_1$ to $C_{12}$ alkyl group; for example, each $R^6$, $R^7$, $R^8$ and $R^{10}$ is independently hydrogen, methyl, ethyl, propyl, butyl, pentyl, hexyl, or an isomer thereof, and in particular embodiments $R^6$, $R^7$, $R^8$ and $R^{10}$ is independently hydrogen or methyl.

In one or more embodiments, $R^9$ is —$R^{11}$—SiR'$_3$, where $R^{11}$ is a $C_1$ to $C_4$ hydrocarbyl, and each R' is independently hydrogen or $C_1$ to $C_{20}$ substituted or unsubstituted hydrocarbyl. In particular embodiments, $R^9$ is —$R^{20}$—SiR'$_3$, where $R^{20}$ is a $C_1$ to $C_4$ hydrocarbyl (e.g. $CH_2$; $CH_2CH_2$, (Me)CHCH$_2$, (Me)CH), and each R' is independently hydrogen or a $C_1$ to $C_{20}$ substituted or unsubstituted hydrocarbyl (e.g. a substituted $C_1$ to $C_{12}$ hydrocarbyl group or an unsubstituted $C_1$ to $C_{12}$ hydrocarbyl group); for example, R' is methyl, ethyl, propyl, butyl, pentyl, hexyl, phenyl, biphenyl, or an isomer thereof. In one or more embodiments, R' is a $C_1$ to $C_{20}$ alkyl or aryl, such as methyl, methyl phenyl, phenyl, biphenyl, pentamethylphenyl, tetramethylphenyl, or di-t-butylphenyl. In one or more embodiments, at least one R' is not hydrogen, alternatively two of R' are not hydrogen, alternatively three of R' are not hydrogen.

Alternatively, $R^9$ is —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$($C_6Me_5$), —$CH_2$—$C(CH_3)_2Ph$, —$CH_2$—$C(Cy)Ph_2$. —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

In one or more embodiments, $R^3$ and $R^9$ are both, independently, —$R^{11}$—SiR'$_3$, where $R^{11}$ is a $C_1$ to $C_4$ hydrocarbyl, and each R' is independently hydrogen or a $C_1$ to $C_{20}$ substituted or unsubstituted hydrocarbyl. In particular embodiments, $R^3$ and $R^9$ are, independently, —$R^{20}$—SiR'$_3$, where $R^{20}$ is a $C_1$ to $C_4$ hydrocarbyl (such as —$CH_2$—, —$CH_2CH_2$—, —(Me)CHCH$_2$—, —(Me)CH—), and each R' is independently hydrogen, or a $C_1$ to $C_{20}$ substituted or unsubstituted hydrocarbyl (e.g. a substituted $C_1$ to $C_{12}$ hydrocarbyl group or an unsubstituted $C_1$ to $C_{12}$ hydrocarbyl group), such as methyl, ethyl, propyl, butyl, pentyl, hexyl, phenyl, biphenyl, or an isomer thereof. In one or more embodiments, R' is a $C_1$ to $C_{20}$ alkyl or aryl, such as methyl, methyl phenyl, phenyl, biphenyl, pentamethylphenyl, tetramethylphenyl, or di-t-butylphenyl; alternatively $R^3$ and $R^9$ are selected from the group consisting of: —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(Et)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternatively, each X may be, independently, a halide, a hydride, an alkyl group, an alkenyl group or an arylalkyl group.

Alternatively, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system). In certain embodiments, each X is independently selected from halides, aryls and $C_1$ to $C_5$ alkyl groups; for example, each X is a phenyl, methyl, ethyl, propyl, butyl, pentyl, or chloro group.

In one or more embodiments, the unbridged hafnium compound is an asymmetric catalyst, which refers to a catalyst compound where a mirror plane cannot be drawn through the metal center and the cyclopentadienyl moieties bridged to the metal center are structurally different. In other embodiments, the unbridged hafnium compound is a symmetric catalyst.

Catalyst compounds represented by formula (A) can be one or more of: (Cp)(3-$CH_2$—$SiMe_3$-Cp)$HfMe_2$; (MeCp)(3-$CH_2$—$SiMe_3$-Cp)$HfMe_2$; (EtCp)(3-$CH_2$—$SiMe_3$-Cp)$HfMe_2$; (PrCp)(3-$CH_2$—$SiMe_3$-Cp)$HfMe_2$; (BuCp)(3-$CH_2$—$SiMe_3$-Cp)$HfMe_2$; (BzCp)(3-$CH_2$—$SiMe_3$-Cp)$HfMe_2$; (3-$CH_2$—$SiMe_3$-Cp)$_2HfMe_2$; ($Me_3Cp$)(3-$CH_2$—$SiMe_3$-Cp)$HfMe_2$; ($Me_4Cp$)(3-$CH_2$—$SiMe_3$-Cp)$HfMe_2$; ($Me_5Cp$)(3-$CH_2$—$SiMe_3$-Cp)$HfMe_2$; (1-Me, 3-Bu-Cp)(3-$CH_2$—$SiMe_3$-Cp)$HfMe_2$; (1-Me, 3-Ph-Cp)(3-$CH_2$—$SiMe_3$-Cp)$HfMe_2$; ($Me_4$Cp-Pr)(3-$CH_2$—$SiMe_3$-Cp)$HfMe_2$; ($Me_4$Cp-$CH_2$—$SiMe_3$)(3-$CH_2$—$SiMe_3$-Cp)$HfMe_2$; (2-Me, 3-$CH_2$—$SiMe_3$-Ind)$_2HfMe_2$; (2-Et,3-$CH_2$—$SiMe_3$-Ind)$_2HfMe_2$; (2-Pr,3-$CH_2$—$SiMe_3$-Ind)$_2HfMe_2$; (2-Bu,3-$CH_2$—$SiMe_3$-Ind)$_2HfMe_2$; (2-Ph,3-$CH_2$—$SiMe_3$-Ind)$_2HfMe_2$; (3-$CH_2$—$SiMe_3$-Ind)$_2HfMe_2$; (3-$CH_2$—$SiMe_3$-Ind)(3-$CH_2$—$SiMe_3$-Cp)$HfMe_2$; (3-Me-Ind)(3-$CH_2$—$SiMe_3$-Cp)$HfMe_2$; (3-Et-Ind)(3-$CH_2$—$SiMe_3$-Cp)$HfMe_2$; (3-Pr-Ind)(3-$CH_2$—$SiMe_3$-Cp)$HfMe_2$; (3-Bu-Ind)(3-$CH_2$—$SiMe_3$-Cp)$HfMe_2$; (Cp)(3-$CH_2$—$SiMe_3$-Ind)$HfMe_2$; (MeCp)(3-$CH_2$—$SiMe_3$-Ind)$HfMe_2$; (EtCp)(3-$CH_2$—$SiMe_3$-Ind)$HfMe_2$; (PrCp)(3-$CH_2$—$SiMe_3$-Ind)$HfMe_2$; (BuCp)(3-$CH_2$—$SiMe_3$-Ind)$HfMe_2$; ($Me_3Cp$)(3-$CH_2$—$SiMe_3$-Ind)$HfMe_2$; ($Me_4Cp$)(3-$CH_2$—$SiMe_3$-Ind)$HfMe_2$; ($Me_5Cp$)(3-$CH_2$—$SiMe_3$-Ind)$HfMe_2$; (1-Me, 3-Bu-Cp)(3-$CH_2$—$SiMe_3$-Ind)$HfMe_2$; (1-Me, 3-Ph-Cp)(3-$CH_2$—$SiMe_3$-Ind)$HfMe_2$, (Cp)(3-$CH_2$—$SiMe_3$-Cp)$HfMe_2$; (MeCp)(3-$CH_2$—$SiMe_3$-Cp)$HfMe_2$; (EtCp)(3-$CH_2$—$SiMe_3$-Cp)$HfMe_2$; (PrCp)(3-$CH_2$—$SiMe_3$-Cp)$HfMe_2$; (BuCp)(3-$CH_2$—$SiMe_3$-Cp)$HfMe_2$; (BzCp)(3-$CH_2$—$SiMe_3$-Cp)$HfMe_2$; (3-$CH_2$—$SiMe_3$-Cp)$_2HfMe_2$; ($Me_2Cp$)(3-$CH_2$—$SiMe_3$-Cp)$HfMe_2$; ($Me_3Cp$)(3-$CH_2$—$SiMe_3$-Cp)$HfMe_2$; ($Me_4Cp$)(3-$CH_2$—$SiMe_3$-Cp)$HfMe_2$; ($Me_5Cp$)(3-$CH_2$—$SiMe_3$-Cp)$HfMe_2$; ($Et_2Cp$)(3-$CH_2$—$SiMe_3$-Cp)$HfMe_2$; ($Et_3Cp$)(3-$CH_2$—$SiMe_3$-Cp)$HfMe_2$; ($Et_4Cp$)(3-$CH_2$—$SiMe_3$-Cp)$HfMe_2$; ($Et_5Cp$)(3-$CH_2$—$SiMe_3$-Cp)$HfMe_2$; ($Pr_2Cp$)(3-$CH_2$—$SiMe_3$-Cp)$HfMe_2$; ($Pr_3Cp$)(3-$CH_2$—$SiMe_3$-Cp)$HfMe_2$; ($Pr_4Cp$)(3-$CH_2$—$SiMe_3$-Cp)$HfMe_2$; ($Pr_5Cp$)(3-$CH_2$—$SiMe_3$-Cp)$HfMe_2$; ($Bu_2Cp$)(3-$CH_2$—$SiMe_3$-Cp)$HfMe_2$; ($Bu_3Cp$)(3-$CH_2$—$SiMe_3$-Cp)$HfMe_2$; ($Bu_4Cp$)(3-$CH_2$—$SiMe_3$-Cp)$HfMe_2$; ($Bu_5Cp$)(3-$CH_2$—$SiMe_3$-Cp)$HfMe_2$; ($Bz_2Cp$)(3-$CH_2$—$SiMe_3$-Cp)$HfMe_2$; ($Bz_3Cp$)(3-$CH_2$—$SiMe_3$-Cp)$HfMe_2$; ($Bz_4Cp$)(3-$CH_2$—$SiMe_3$-Cp)$HfMe_2$; ($Bz_5Cp$)(3-$CH_2$—$SiMe_3$-Cp)$HfMe_2$; ($EtMe_4Cp$)(3-$CH_2$—$SiMe_3$-Cp)$HfMe_2$; ($PrMe_4Cp$)(3-$CH_2$—$SiMe_3$-Cp)$HfMe_2$; ($BuMe_4Cp$)(3-$CH_2$—$SiMe_3$-Cp)$HfMe_2$; ($PnMe_4Cp$)(3-$CH_2$—$SiMe_3$-Cp)$HfMe_2$; ($HxMe_4Cp$)(3-$CH_2$—$SiMe_3$-Cp)$HfMe_2$; ($BzMe_4Cp$)(3-$CH_2$—$SiMe_3$-Cp)$HfMe_2$; ($Me_4$Cp-$CH_2$—$SiMe_3$)(3-$CH_2$—$SiMe_3$-Cp)$HfMe_2$; ($Me_4$Cp-$CH_2$—$SiMe_2Ph$)(3-$CH_2$—$SiMe_3$-Cp)$HfMe_2$; ($Me_4$Cp-$CH_2$—$SiMe_2Ph$)(3-$CH_2$—$SiMe_3$-Cp)$HfMe_2$; ($Me_4$Cp-$CH_2$—$SiMePh_2$)(3-$CH_2$—$SiMe_3$-Cp)$HfMe_2$; ($Me_4$Cp-$CH_2$—$SiPh_3$)(3-$CH_2$—$SiMe_3$-Cp)$HfMe_2$; ($Me_4$Cp-$CH_2$—$SiMe_2Cy$)(3-$CH_2$—$SiMe_3$-Cp)$HfMe_2$; ($Me_4$Cp-$CH_2$—$SiMeCy_2$)(3-$CH_2$—$SiMe_3$-Cp)$HfMe_2$; ($Me_4$Cp-$CH_2$—$SiCy_3$)(3-$CH_2$—$SiMe_3$-Cp)$HfMe_2$; ($EtMe_3Cp$)(3-$CH_2$—$SiMe_3$-Cp)$HfMe_2$; ($PrMe_3Cp$)(3-$CH_2$—$SiMe_3$-Cp)$HfMe_2$; ($BuMe_3Cp$)(3-$CH_2$—$SiMe_3$-Cp)$HfMe_2$; ($BzMe_3Cp$)(3-$CH_2$—$SiMe_3$-Cp)$HfMe_2$; ($Me_3$Cp-$CH_2$—$SiMe_3$)(3-$CH_2$—$SiMe_3$-Cp)$HfMe_2$; ($Me_3$Cp-$CH_2$—$SiMe_2Ph$)(3-$CH_2$—$SiPh_3$-Cp)$HfMe_2$; ($Me_3$Cp-$CH_2$—$SiMePh_2$)(3-$CH_2$—$SiMe_3$-Cp)$HfMe_2$; ($Me_3$Cp-$CH_2$—$SiPh_3$)(3-$CH_2$—$SiMe_3$-Cp)$HfMe_2$; ($Me_3$Cp-$CH_2$—$SiMe_2Cy$)(3-$CH_2$—$SiMe_3$-Cp)$HfMe_2$; ($Me_3$Cp-$CH_2$—$SiMeCy_2$)(3-$CH_2$—$SiMe_3$-Cp)$HfMe_2$; ($Me_3$Cp-$CH_2$—$SiCy_3$)(3-$CH_2$—$SiMe_3$-Cp)$HfMe_2$; (MeEtCp)(3-$CH_2$—$SiMe_3$-Cp)$HfMe_2$; (MePrCp)(3-$CH_2$—$SiMe_3$-Cp)$HfMe_2$; (MeBuCp)(3-$CH_2$—$SiMe_3$-Cp)$HfMe_2$; (BzMeCp)(3-$CH_2$—$SiMe_3$-Cp)$HfMe_2$; (EtPrCp)(3-$CH_2$—$SiMe_3$-Cp)$HfMe_2$; (EtBuCp)(3-$CH_2$—$SiMe_3$-Cp)$HfMe_2$; (BzEtCp)(3-$CH_2$—$SiMe_3$-Cp)$HfMe_2$; (PrBuCp)(3-$CH_2$—$SiMe_3$-Cp)$HfMe_2$; (BzPrCp)(3-$CH_2$—$SiMe_3$-Cp)$HfMe_2$; (BuBzCp)(3-$CH_2$—$SiMe_3$-Cp)$HfMe_2$; (Cp)(3-$CH_2$—$SiMe_2Ph$-Cp)$HfMe_2$; (MeCp)(3-$CH_2$—$SiMe_2Ph$-Cp)$HfMe_2$; (EtCp)(3-$CH_2$—$SiMe_2Ph$-Cp)$HfMe_2$; (PrCp)(3-$CH_2$—$SiMe_2Ph$-Cp)$HfMe_2$; (BuCp)(3-$CH_2$—$SiMe_2Ph$-Cp)$HfMe_2$; (BzCp)(3-$CH_2$—$SiMe_2Ph$-Cp)$HfMe_2$; (3-$CH_2$—$SiMe_2Ph$-Cp)$_2HfMe_2$; ($Me_2Cp$)(3-$CH_2$—$SiMe_2Ph$-Cp)$HfMe_2$; ($Me_3Cp$)(3-$CH_2$—$SiMe_2Ph$-Cp)$HfMe_2$; ($Me_4Cp$)(3-$CH_2$—$SiMe_2Ph$-Cp)$HfMe_2$; ($Me_5Cp$)(3-$CH_2$—$SiMe_2Ph$-Cp)$HfMe_2$; ($Et_2Cp$)(3-$CH_2$—$SiMe_2Ph$-Cp)$HfMe_2$; ($Et_3Cp$)(3-$CH_2$—$SiMe_2Ph$-Cp)$HfMe_2$; ($Et_4Cp$)(3-$CH_2$—$SiMe_2Ph$-Cp)$HfMe_2$; ($Et_5Cp$)(3-$CH_2$—$SiMe_2Ph$-Cp)$HfMe_2$; ($Pr_2Cp$)(3-$CH_2$—$SiMe_2Ph$-Cp)$HfMe_2$; ($Pr_3Cp$)(3-$CH_2$—$SiMe_2Ph$-Cp)$HfMe_2$; ($Pr_4Cp$)(3-$CH_2$—$SiMe_2Ph$-Cp)$HfMe_2$; ($Pr_5Cp$)(3-$CH_2$—$SiMe_2Ph$-Cp)$HfMe_2$; ($Bu_2Cp$)(3-$CH_2$—$SiMe_2Ph$-Cp)$HfMe_2$; ($Bu_3Cp$)(3-$CH_2$—$SiMe_2Ph$-Cp)$HfMe_2$; ($Bu_4Cp$)(3-$CH_2$—$SiMe_2Ph$-Cp)$HfMe_2$; ($Bu_5Cp$)(3-$CH_2$—$SiMe_2Ph$-Cp)$HfMe_2$; ($Bz_2Cp$)(3-$CH_2$—$SiMe_2Ph$-Cp)$HfMe_2$; ($Bz_3Cp$)(3-$CH_2$—$SiMe_2Ph$-Cp)$HfMe_2$; ($Bz_4Cp$)(3-$CH_2$—$SiMe_2Ph$-Cp)$HfMe_2$; ($Bz_5Cp$)(3-$CH_2$—$SiMe_2Ph$-Cp)$HfMe_2$; ($EtMe_4Cp$)(3-$CH_2$—$SiMe_2Ph$-Cp)$HfMe_2$; ($PrMe_4Cp$)(3-$CH_2$—$SiMe_2Ph$-Cp)$HfMe_2$; ($BuMe_4Cp$)(3-$CH_2$—$SiMe_2Ph$-Cp)$HfMe_2$; ($BzMe_4Cp$)(3-$CH_2$—$SiMe_2Ph$-Cp)$HfMe_2$; ($Me_4$Cp-$CH_2$—$SiMe_3$)(3-$CH_2$—$SiMe_2Ph$-Cp)$HfMe_2$; ($Me_4$Cp-$CH_2$—$SiMe_2Ph$)(3-$CH_2$—$SiMe_2Ph$-Cp)$HfMe_2$; ($Me_4$Cp-$CH_2$—$SiMePh_2$)(3-$CH_2$—$SiMe_2Ph$-Cp)$HfMe_2$; ($Me_4$Cp-$CH_2$—$SiPh_3$)(3-$CH_2$—$SiMe_2Ph$-Cp)$HfMe_2$; ($Me_4$Cp-$CH_2$—$SiMe_2Cy$)(3-$CH_2$—$SiMe_2Ph$-Cp)$HfCl_2$; ($Me_4$Cp-$CH_2$—$SiMeCy_2$)(3-$CH_2$—$SiMe_2Ph$-Cp)$HfCl_2$; ($Me_4$Cp-$CH_2$—$SiCy_3$)(3-$CH_2$—$SiMe_2Ph$-Cp)$HfMe_2$; ($EtMe_3Cp$)(3-$CH_2$—$SiMe_2Ph$-Cp)$HfMe_2$; ($PrMe_3Cp$)(3-$CH_2$—$SiMe_2Ph$-Cp)$HfMe_2$; ($BuMe_3Cp$)(3-$CH_2$—

SiMe$_2$Ph-Cp)HfMe$_2$; (BzMe$_3$Cp)(3-CH$_2$—SiMe$_2$Ph-Cp)HfMe$_2$; (Me$_3$Cp-CH$_2$—SiMe$_3$)(3-CH$_2$—SiMe$_2$Ph-Cp)HfMe$_2$; (Me$_3$Cp-CH$_2$—SiMe$_2$Ph)(3-CH$_2$—SiMe$_2$Ph-Cp)HfMe$_2$; (Me$_3$Cp-CH$_2$—SiMePh$_2$)(3-CH$_2$—SiMe$_2$Ph-Cp)HfMe$_2$; (Me$_3$Cp-CH$_2$—SiPh$_3$)(3-CH$_2$—SiMe$_2$Ph-Cp)HfMe$_2$; (Me$_3$Cp-CH$_2$—SiMe$_2$Cy)(3-CH$_2$—SiMe$_2$Ph-Cp)HfMe$_2$; (Me$_3$Cp-CH$_2$—SiMeCy$_2$)(3-CH$_2$—SiMe$_2$Ph-Cp)HfMe$_2$; (Me$_3$Cp-CH$_2$—SiCy$_3$)(3-CH$_2$—SiMe$_2$Ph-Cp)HfMe$_2$; (MeEtCp)(3-CH$_2$—SiMe$_2$Ph-Cp)HfMe$_2$; (MePrCp)(3-CH$_2$—SiMe$_2$Ph-Cp)HfMe$_2$; (MeBuCp)(3-CH$_2$—SiMe$_2$Ph-Cp)HfMe$_2$; (BzMeCp)(3-CH$_2$—SiMe$_2$Ph-Cp)HfMe$_2$; (EtPrCp)(3-CH$_2$—SiMe$_2$Ph-Cp)HfMe$_2$; (EtBuCp)(3-CH$_2$—SiMe$_2$Ph-Cp)HfMe$_2$; (BzEtCp)(3-CH$_2$—SiMe$_2$Ph-Cp)HfMe$_2$; (PrBuCp)(3-CH$_2$—SiMe$_2$Ph-Cp)HfMe$_2$; (BzPrCp)(3-CH$_2$—SiMe$_2$Ph-Cp)HfMe$_2$; (BuBzCp)(3-CH$_2$—SiMe$_2$Ph-Cp)HfMe$_2$; (Cp)(3-CH$_2$—SiMePh$_2$-Cp)HfMe$_2$; (MeCp)(3-CH$_2$—SiMePh$_2$-Cp)HfMe$_2$; (EtCp)(3-CH$_2$—SiMePh$_2$-Cp)HfMe$_2$; (PrCp)(3-CH$_2$—SiMePh$_2$-Cp)HfMe$_2$; (BuCp)(3-CH$_2$—SiMePh$_2$-Cp)HfMe$_2$; ((BzCp)(3-CH$_2$—SiMePh$_2$-Cp)HfMe$_2$; (3-CH$_2$—SiMePh$_2$-Cp)$_2$HfMe$_2$; (Me$_2$Cp)(3-CH$_2$—SiMePh$_2$-Cp)HfMe$_2$; (Me$_3$Cp)(3-CH$_2$—SiMePh$_2$-Cp)HfMe$_2$; (Me$_4$Cp)(3-CH$_2$—SiMePh$_2$-Cp)HfMe$_2$; (Me$_5$Cp)(3-CH$_2$—SiMePh$_2$-Cp)HfMe$_2$; (Et$_2$Cp)(3-CH$_2$—SiMePh$_2$-Cp)HfMe$_2$; (Et$_3$Cp)(3-CH$_2$—SiMePh$_2$-Cp)HfMe$_2$; (Et$_4$Cp)(3-CH$_2$—SiMePh$_2$-Cp)HfMe$_2$; (Et$_5$Cp)(3-CH$_2$—SiMePh$_2$-Cp)HfMe$_2$; (Pr$_2$Cp)(3-CH$_2$—SiMePh$_2$-Cp)HfMe$_2$; (Pr$_3$Cp)(3-CH$_2$—SiMePh$_2$-Cp)HfMe$_2$; (Pr$_4$Cp)(3-CH$_2$—SiMePh$_2$-Cp)HfMe$_2$; (Pr$_5$Cp)(3-CH$_2$—SiMePh$_2$-Cp)HfMe$_2$; (Bu$_2$Cp)(3-CH$_2$—SiMePh$_2$-Cp)HfMe$_2$; (Bu$_3$Cp)(3-CH$_2$—SiMePh$_2$-Cp)HfMe$_2$; (Bu$_4$Cp)(3-CH$_2$—SiMePh$_2$-Cp)HfMe$_2$; (Bu$_5$Cp)(3-CH$_2$—SiMePh$_2$-Cp)HfMe$_2$; (Bz$_2$Cp)(3-CH$_2$—SiMePh$_2$-Cp)HfMe$_2$; (Bz$_3$Cp)(3-CH$_2$—SiMePh$_2$-Cp)HfMe$_2$; (Bz$_4$Cp)(3-CH$_2$—SiMePh$_2$-Cp)HfMe$_2$; (Bz$_5$Cp)(3-CH$_2$—SiMePh$_2$-Cp)HfMe$_2$; (EtMe$_4$Cp)(3-CH$_2$—SiMePh$_2$-Cp)HfMe$_2$; (PrMe$_4$Cp)(3—CH$_2$—SiMePh$_2$-Cp)HfMe$_2$; (BuMe$_4$Cp)(3-CH$_2$—SiMePh$_2$-Cp)HfMe$_2$; (PnMe$_4$Cp)(3-CH$_2$—SiMePh$_2$-Cp)HfMe$_2$; (HxMe$_4$Cp)(3-CH$_2$—SiMePh$_2$-Cp)HfMe$_2$; (BzMe$_4$Cp)(3-CH$_2$—SiMePh$_2$-Cp)HfMe$_2$; (Me$_4$Cp-CH$_2$—SiMe$_3$)(3-CH$_2$—SiMePh$_2$-Cp)HfMe$_2$; (Me$_4$Cp-CH$_2$—SiMe$_2$Ph)(3-CH$_2$—SiMePh$_2$-Cp)HfMe$_2$; (Me$_4$Cp-CH$_2$—SiMePh$_2$)(3-CH$_2$—SiMePh$_2$-Cp)HfMe$_2$; (Me$_4$Cp-CH$_2$—SiPh$_3$)(3-CH$_2$—SiMePh$_2$-Cp)HfMe$_2$; (Me$_4$Cp-CH$_2$—SiMe$_2$Cy)(3-CH$_2$—SiMePh$_2$-Cp)HfMe$_2$; (Me$_4$Cp-CH$_2$—SiMeCy$_2$)(3-CH$_2$—SiMePh$_2$-Cp)HfMe$_2$; (Me$_4$Cp-CH$_2$—SiCy$_3$)(3-CH$_2$—SiMePh$_2$-Cp)HfMe$_2$; (EtMe$_3$Cp)(3-CH$_2$—SiMePh$_2$-Cp)HfMe$_2$; (PrMe$_3$Cp)(3-CH$_2$—SiMePh$_2$-Cp)HfMe$_2$; (BuMe$_3$Cp)(3-CH$_2$—SiMePh$_2$-Cp)HfMe$_2$; (BzMe$_3$Cp)(3-CH$_2$—SiMePh$_2$-Cp)HfMe$_2$; (Me$_3$Cp-CH$_2$—SiMe$_3$)(3-CH$_2$—SiMePh$_2$-Cp)HfMe$_2$; (Me$_3$Cp-CH$_2$—SiMe$_2$Ph)(3-CH$_2$—SiMePh$_2$-Cp)HfMe$_2$; (Me$_3$Cp-CH$_2$—SiMePh$_2$)(3-CH$_2$—SiMePh$_2$-Cp)HfMe$_2$; (Me$_3$Cp-CH$_2$—SiPh$_3$)(3-CH$_2$—SiMePh$_2$-Cp)HfMe$_2$; (Me$_3$Cp-CH$_2$—SiMe$_2$Cy)(3-CH$_2$—SiMePh$_2$-Cp)HfMe$_2$; (Me$_3$Cp-CH$_2$—SiMeCy$_2$)(3-CH$_2$—SiMePh$_2$-Cp)HfMe$_2$; (Me$_3$Cp-CH$_2$—SiCy$_3$)(3-CH$_2$—SiMePh$_2$-Cp)HfMe$_2$; (MeEtCp)(3-CH$_2$—SiMePh$_2$-Cp)HfMe$_2$; (MePrCp)(3-CH$_2$—SiMePh$_2$-Cp)HfMe$_2$; (MeBuCp)(3-CH$_2$—SiMePh$_2$-Cp)HfMe$_2$; (BzMeCp)(3-CH$_2$—SiMePh$_2$-Cp)HfMe$_2$; (EtPrCp)(3-CH$_2$—SiMePh$_2$-Cp)HfMe$_2$; (EtBuCp)(3-CH$_2$—SiMePh$_2$-Cp)HfMe$_2$; (BzEtCp)(3-CH$_2$—SiMePh$_2$-Cp)HfMe$_2$; (PrBuCp)(3-CH$_2$—SiMePh$_2$-Cp)HfMe$_2$; (BzPrCp)(3-CH$_2$—SiMePh$_2$-Cp)HfMe$_2$; (BuBzCp)(3-CH$_2$—SiMePh$_2$-Cp)HfMe$_2$; (Cp)(3-CH$_2$—SiPh$_3$-Cp)HfMe$_2$; (MeCp)(3-CH$_2$—SiPh$_3$-Cp)HfMe$_2$; (EtCp)(3-CH$_2$—SiPh$_3$-Cp)HfMe$_2$; (PrCp)(3-CH$_2$—SiPh$_3$-Cp)HfMe$_2$; (BuCp)(3-CH$_2$—SiPh$_3$-Cp)HfMe$_2$; (BzCp)(3-CH$_2$—SiPh$_3$-Cp)HfMe$_2$; (3-CH$_2$—SiPh$_3$-Cp)$_2$HfMe$_2$; (Me$_2$Cp)(3-CH$_2$—SiPh$_3$-Cp)HfMe$_2$; (Me$_3$Cp)(3-CH$_2$—SiPh$_3$-Cp)HfMe$_2$; (Me$_4$Cp)(3-CH$_2$—SiPh$_3$-Cp)HfMe$_2$; (Me$_5$Cp)(3-CH$_2$—SiPh$_3$-Cp)HfMe$_2$; (Et$_2$Cp)(3-CH$_2$—SiPh$_3$-Cp)HfMe$_2$; (Et$_3$Cp)(3-CH$_2$—SiPh$_3$-Cp)HfMe$_2$; (Et$_4$Cp)(3-CH$_2$—SiPh$_3$-Cp)HfMe$_2$; (Et$_5$Cp)(3-CH$_2$—SiPh$_3$-Cp)HfMe$_2$; (Pr$_2$Cp)(3-CH$_2$—SiPh$_3$-Cp)HfMe$_2$; (Pr$_3$Cp)(3-CH$_2$—SiPh$_3$-Cp)HfMe$_2$; (Pr$_4$Cp)(3-CH$_2$—SiPh$_3$-Cp)HfMe$_2$; (Pr$_5$Cp)(3-CH$_2$—SiPh$_3$-Cp)HfMe$_2$; (Bu$_2$Cp)(3-CH$_2$—SiPh$_3$-Cp)HfMe$_2$; (Bu$_3$Cp)(3-CH$_2$—SiPh$_3$-Cp)HfMe$_2$; (Bu$_4$Cp)(3-CH$_2$—SiPh$_3$-Cp)HfMe$_2$; (Bu$_5$Cp)(3-CH$_2$—SiPh$_3$-Cp)HfMe$_2$; (Bz$_2$Cp)(3-CH$_2$—SiPh$_3$-Cp)HfMe$_2$; (Bz$_3$Cp)(3-CH$_2$—SiPh$_3$-Cp)HfMe$_2$; (Bz$_4$Cp)(3-CH$_2$—SiPh$_3$-Cp)HfMe$_2$; (Bz$_5$Cp)(3-CH$_2$—SiPh$_3$-Cp)HfMe$_2$; (EtMe$_4$Cp)(3-CH$_2$—SiPh$_3$-Cp)HfMe$_2$; (PrMe$_4$Cp)(3-CH$_2$—SiPh$_3$-Cp)HfMe$_2$; (BuMe$_4$Cp)(3-CH$_2$—SiPh$_3$-Cp)HfMe$_2$; (BzMe$_4$Cp)(3-CH$_2$—SiPh$_3$-Cp)HfMe$_2$; (Me$_4$Cp-CH$_2$—SiMe$_3$)(3-CH$_2$—SiPh$_3$-Cp)HfMe$_2$; (Me$_4$Cp-CH$_2$—SiMe$_2$Ph)(3-CH$_2$—SiPh$_3$-Cp)HfMe$_2$; (Me$_4$Cp-CH$_2$—SiMePh$_2$)(3-CH$_2$—SiPh$_3$-Cp)HfMe$_2$; (Me$_4$Cp-CH$_2$—SiPh$_3$)(3-CH$_2$—SiPh$_3$-Cp)HfMe$_2$; (Me$_4$Cp-CH$_2$—SiMe$_2$Cy)(3-CH$_2$—SiPh$_3$-Cp)HfMe$_2$; (Me$_4$Cp-CH$_2$—SiMeCy$_2$)(3-CH$_2$—SiPh$_3$-Cp)HfMe$_2$; (Me$_4$Cp-CH$_2$—SiCy$_3$)(3-CH$_2$—SiPh$_3$-Cp)HfMe$_2$; (EtMe$_3$Cp)(3-CH$_2$—SiPh$_3$-Cp)HfMe$_2$; (PrMe$_3$Cp)(3-CH$_2$—SiPh$_3$-Cp)HfMe$_2$; (BuMe$_3$Cp)(3-CH$_2$—SiPh$_3$-Cp)HfMe$_2$; (BzMe$_3$Cp)(3-CH$_2$—SiPh$_3$-Cp)HfMe$_2$; (Me$_3$Cp-CH$_2$—SiMe$_3$)(3-CH$_2$—SiPh$_3$-Cp)HfMe$_2$; (Me$_3$Cp-CH$_2$—SiMe$_2$Ph)(3-CH$_2$—SiPh$_3$-Cp)HfMe$_2$; (Me$_3$Cp-CH$_2$—SiMePh$_2$)(3-CH$_2$—SiPh$_3$-Cp)HfMe$_2$; (Me$_3$Cp-CH$_2$—SiPh$_3$)(3-CH$_2$—SiPh$_3$-Cp)HfMe$_2$; (Me$_3$Cp-CH$_2$—SiMe$_2$Cy)(3-CH$_2$—SiPh$_3$-Cp)HfMe$_2$; (Me$_3$Cp-CH$_2$—SiMeCy$_2$)(3-CH$_2$—SiPh$_3$-Cp)HfMe$_2$; (Me$_3$Cp-CH$_2$—SiCy$_3$)(3-CH$_2$—SiPh$_3$-Cp)HfMe$_2$; (MeEtCp)(3-CH$_2$—SiPh$_3$-Cp)HfMe$_2$; (MePrCp)(3-CH$_2$—SiPh$_3$-Cp)HfMe$_2$; (MeBuCp)(3-CH$_2$—SiPh$_3$-Cp)HfMe$_2$; (BzMeCp)(3-CH$_2$—SiPh$_3$-Cp)HfMe$_2$; (EtPrCp)(3-CH$_2$—SiPh$_3$-Cp)HfMe$_2$; (EtBuCp)(3-CH$_2$—SiPh$_3$-Cp)HfMe$_2$; (BzEtCp)(3-CH$_2$—SiPh$_3$-Cp)HfMe$_2$; (PrBuCp)(3-CH$_2$—SiPh$_3$-Cp)HfMe$_2$; (BzPrCp)(3-CH$_2$—SiPh$_3$-Cp)HfMe$_2$; (BuBzCp)(3-CH$_2$—SiPh$_3$-Cp)HfMe$_2$; (Cp)(3-CH$_2$—SiCyMe$_2$-Cp)HfMe$_2$; (MeCp)(3-CH$_2$—SiCyMe$_2$-Cp)HfMe$_2$; (EtCp)(3-CH$_2$—SiCyMe$_2$-Cp)HfMe$_2$; (PrCp)(3-CH$_2$—SiCyMe$_2$-Cp)HfMe$_2$; (BuCp)(3-CH$_2$—SiCyMe$_2$-Cp)HfMe$_2$; (BzCp)(3-CH$_2$—SiCyMe$_2$-Cp)HfMe$_2$; (3-CH$_2$—SiCyMe$_2$-Cp)$_2$HfMe$_2$; (Me$_2$Cp)(3-CH$_2$—SiCyMe$_2$-Cp)HfMe$_2$; (Me$_3$Cp)(3-CH$_2$—SiCyMe$_2$-Cp)HfMe$_2$; (Me$_4$Cp)(3-CH$_2$—SiCyMe$_2$-Cp)HfMe$_2$; (Me$_5$Cp)(3-CH$_2$—SiCyMe$_2$-Cp)HfMe$_2$; (Et$_2$Cp)(3-CH$_2$—SiCyMe$_2$-Cp)HfMe$_2$; (Et$_3$Cp)(3-CH$_2$—SiCyMe$_2$-Cp)HfMe$_2$; (Et$_4$Cp)(3-CH$_2$—SiCyMe$_2$-Cp)HfMe$_2$; (Et$_5$Cp)(3-CH$_2$—SiCyMe$_2$-Cp)HfMe$_2$; (Pr$_2$Cp)(3-CH$_2$—SiCyMe$_2$-Cp)HfMe$_2$; (Pr$_3$Cp)(3-CH$_2$—SiCyMe$_2$-Cp)HfMe$_2$; (Pr$_4$Cp)(3-CH$_2$—SiCyMe$_2$-Cp)HfMe$_2$; (Pr$_5$Cp)(3-CH$_2$—SiCyMe$_2$-Cp)HfMe$_2$; (Bu$_2$Cp)(3-CH$_2$—SiCyMe$_2$-Cp)HfMe$_2$; (Bu$_3$Cp)(3-CH$_2$—SiCyMe$_2$-Cp)HfMe$_2$; (Bu$_4$Cp)(3-CH$_2$—SiCyMe$_2$-Cp)HfMe$_2$; (Bu$_5$Cp)(3-CH$_2$—SiCyMe$_2$-Cp)HfMe$_2$; (Bz$_2$Cp)(3-CH$_2$—SiCyMe$_2$-Cp)HfMe$_2$; (Bz$_3$Cp)(3-CH$_2$—SiCyMe$_2$-Cp)HfMe$_2$; (Bz$_4$Cp)(3-CH$_2$—SiCyMe$_2$-Cp)HfMe$_2$; (Bz$_5$Cp)(3-CH$_2$—SiCyMe$_2$-Cp)HfMe$_2$; (EtMe$_4$Cp)(3-CH$_2$—SiCyMe$_2$-Cp)HfMe$_2$; (PrMe$_4$Cp)(3-CH$_2$—SiCyMe$_2$-Cp)HfMe$_2$; (BuMe$_4$Cp)(3-CH$_2$—SiCyMe$_2$-Cp)HfMe$_2$; (BzMe$_4$Cp)(3-CH$_2$—SiCyMe$_2$-Cp)HfMe$_2$; (Me$_4$Cp-CH$_2$—SiMe$_3$)(3-CH$_2$—SiCyMe$_2$-Cp)HfMe$_2$; (Me$_4$Cp-CH$_2$—SiCyMe$_2$Ph)(3-CH$_2$—SiCyMe$_2$-Cp)HfMe$_2$; (Me$_4$Cp-CH$_2$—SiMePh$_2$)(3-CH$_2$—SiCyMe$_2$-Cp)HfMe$_2$; (Me$_4$Cp-CH$_2$—SiPh$_3$)(3-CH$_2$—SiCyMe$_2$-Cp)HfMe$_2$; (Me$_4$Cp-CH$_2$—SiMe$_2$Cy)(3-CH$_2$—SiCyMe$_2$-Cp)HfMe$_2$; (Me$_4$Cp-CH$_2$—SiMeCy$_2$)(3-CH$_2$—SiCyMe$_2$-Cp)HfMe$_2$;

HfMe₂; (Me₄Cp-CH₂—SiCy₃)(3-CH₂—SiCyMe₂-Cp)HfMe₂; (EtMe₃Cp)(3-CH₂—SiCyMe₂-Cp)HfMe₂; (PrMe₃Cp)(3-CH₂—SiCyMe₂-Cp)HfMe₂; (BuMe₃Cp)(3-CH₂—SiCyMe₂-Cp)HfMe₂; (BzMe₃Cp)(3-CH₂—SiCyMe₂-Cp)HfMe₂; (Me₃Cp-CH₂—SiMe₃)(3-CH₂—SiCyMe₂-Cp)HfMe₂; (Me₃Cp-CH₂—SiMe₂Ph)(3-CH₂—SiCyMe₂-Cp)HfMe₂; (Me₃Cp-CH₂—SiMePh₂)(3-CH₂—SiCyMe₂-Cp)HfMe₂; (Me₃Cp-CH₂—SiPh₃)(3-CH₂—SiCyMe₂-Cp)HfMe₂; (Me₃Cp-CH₂—SiMe₂Cy)(3-CH₂—SiCyMe₂-Cp)HfMe₂; (Me₃Cp-CH₂—SiMeCy₂)(3-CH₂—SiCyMe₂-Cp)HfMe₂; (Me₃Cp-CH₂—SiCy₃)(3-CH₂—SiCyMe₂-Cp)HfMe₂; (MeEtCp)(3-CH₂—SiCyMe₂-Cp)HfMe₂; (MePrCp)(3-CH₂—SiCyMe₂-Cp)HfMe₂; (MeBuCp)(3-CH₂—SiCyMe₂-Cp)HfMe₂; (BzMeCp)(3-CH₂—SiCyMe₂-Cp)HfMe₂; (EtPrCp)(3-CH₂—SiCyMe₂-Cp)HfMe₂; (EtBuCp)(3-CH₂—SiCyMe₂-Cp)HfMe₂; (BzEtCp)(3-CH₂—SiCyMe₂-Cp)HfMe₂; (PrBuCp)(3-CH₂—SiCyMe₂-Cp)HfMe₂; (BzPrCp)(3-CH₂—SiCyMe₂-Cp)HfMe₂; (BuBzCp)(3-CH₂—SiCyMe₂-Cp)HfMe₂; (Cp)(3-CH₂—SiCy₂Me-Cp)HfMe₂; (MeCp)(3-CH₂—SiCy₂Me-Cp)HfMe₂; (EtCp)(3-CH₂—SiCy₂Me-Cp)HfMe₂; (PrCp)(3-CH₂—SiCy₂Me-Cp)HfMe₂; (BuCp)(3-CH₂—SiCy₂Me-Cp)HfMe₂; (BzCp)(3-CH₂—SiCy₂Me-Cp)HfMe₂; (3-CH₂—SiCy₂Me-Cp)₂HfMe₂; (Me₂Cp)(3-CH₂—SiCy₂Me-Cp)HfMe₂; (Me₃Cp)(3-CH₂—SiCy₂Me-Cp)HfMe₂; (Me₄Cp)(3-CH₂—SiCy₂Me-Cp)HfMe₂; (Me₅Cp)(3-CH₂—SiCy₂Me-Cp)HfMe₂; (Et₂Cp)(3-CH₂—SiCy₂Me-Cp)HfMe₂; (Et₃Cp)(3-CH₂—SiCy₂Me-Cp)HfMe₂; (Et₄Cp)(3-CH₂—SiCy₂Me-Cp)HfMe₂; (Et₅Cp)(3-CH₂—SiCy₂Me-Cp)HfMe₂; (Pr₂Cp)(3-CH₂—SiCy₂Me-Cp)HfMe₂; (Pr₃Cp)(3-CH₂—SiCy₂Me-Cp)HfMe₂; (Pr₄Cp)(3-CH₂—SiCy₂Me-Cp)HfMe₂; (Pr₅Cp)(3-CH₂—SiCy₂Me-Cp)HfMe₂; (Bu₂Cp)(3-CH₂—SiCy₂Me-Cp)HfMe₂; (Bu₃Cp)(3-CH₂—SiCy₂Me-Cp)HfCl₂; (Bu₄Cp)(3-CH₂—SiCy₂Me-Cp)HfCl₂; (Bu₅Cp)(3-CH₂—SiCy₂Me-Cp)HfCl₂; (Bz₂Cp)(3-CH₂—SiCy₂Me-Cp)HfMe₂; (Bz₃Cp)(3-CH₂—SiCy₂Me-Cp)HfMe₂; (Bz₄Cp)(3-CH₂—SiCy₂Me-Cp)HfCl₂; (Bz₅Cp)(3-CH₂—SiCy₂Me-Cp)HfCl₂; (EtMe₄Cp)(3-CH₂—SiCy₂Me-Cp)HfCl₂; (PrMe₄Cp)(3-CH₂—SiCy₂Me-Cp)HfMe₂; (BuMe₄Cp)(3-CH₂—SiCy₂Me-Cp)HfMe₂; (BzMe₄Cp)(3-CH₂—SiCy₂Me-Cp)HfMe₂; (Me₄Cp-CH₂—SiMe₃)(3-CH₂—SiCy₂Me-Cp)HfMe₂; (Me₄Cp-CH₂—SiMe₂Ph)(3-CH₂—SiCy₂Me-Cp)HfMe₂; (Me₄Cp-CH₂—SiMePh₂)(3-CH₂—SiCy₂Me-Cp)HfMe₂; (Me₄Cp-CH₂—SiPh₃)(3-CH₂—SiCy₂Me-Cp)HfMe₂; (Me₄Cp-CH₂—SiMe₂Cy)(3-CH₂—SiCy₂Me-Cp)HfMe₂; (Me₄Cp-CH₂—SiMeCy₂)(3-CH₂—SiCy₂Me-Cp)HfMe₂; (Me₄Cp-CH₂—SiCy₃)(3-CH₂—SiCy₂Me-Cp)HfMe₂; (EtMe₃Cp)(3-CH₂—SiCy₂Me-Cp)HfMe₂; (PrMe₃Cp)(3-CH₂—SiCy₂Me-Cp)HfMe₂; (BuMe₃Cp)(3-CH₂—SiCy₂Me-Cp)HfMe₂; (BzMe₃Cp)(3-CH₂—SiCy₂Me-Cp)HfMe₂; (Me₃Cp-CH₂—SiMe₃)(3-CH₂—SiCy₂Me-Cp)HfMe₂; (Me₃Cp-CH₂—SiMe₂Ph)(3-CH₂—SiCy₂Me-Cp)HfMe₂; (Me₃Cp-CH₂—SiMePh₂)(3-CH₂—SiCy₂Me-Cp)HfMe₂; (Me₃Cp-CH₂—SiPh₃)(3-CH₂—SiCy₂Me-Cp)HfMe₂; (Me₃Cp-CH₂—SiMe₂Cy)(3-CH₂—SiCy₂Me-Cp)HfMe₂; (Me₃Cp-CH₂—SiMeCy₂)(3-CH₂—SiCy₂Me-Cp)HfMe₂; (Me₃Cp-CH₂—SiCy₃)(3-CH₂—SiCy₂Me-Cp)HfMe₂; (MeEtCp)(3-CH₂—SiCy₂Me-Cp)HfMe₂; (MePrCp)(3-CH₂—SiCy₂Me-Cp)HfMe₂; (MeBuCp)(3-CH₂—SiCy₂Me-Cp)HfMe₂; (BzMeCp)(3-CH₂—SiCy₂Me-Cp)HfMe₂; (EtPrCp)(3-CH₂—SiCy₂Me-Cp)HfMe₂; (EtBuCp)(3-CH₂—SiCy₂Me-Cp)HfMe₂; (BzEtCp)(3-CH₂—SiCy₂Me-Cp)HfMe₂; (PrBuCp)(3-CH₂—SiCy₂Me-Cp)HfMe₂; (BzPrCp)(3-CH₂—SiCy₂Me-Cp)HfMe₂; (BuBzCp)(3-CH₂—SiCy₂Me-Cp)HfMe₂; (Cp)(3-CH₂—SiCy₃-Cp)HfMe₂; (MeCp)(3-CH₂—SiCy₃-Cp)HfMe₂; (EtCp)(3-CH₂—SiCy₃-Cp)HfMe₂; (PrCp)(3-CH₂—SiCy₃-Cp)HfMe₂; (BuCp)(3-CH₂—SiCy₃-Cp)HfMe₂ (BzCp)(3-CH₂-SiCy₃-Cp)HfMe₂; (3-CH₂—SiCy₃-Cp)₂HfMe₂; (Me₂Cp)(3-CH₂—SiCy₃-Cp)HfMe₂; (Me₃Cp)(3-CH₂—SiCy₃-Cp)HfMe₂; (Me₄Cp)(3-CH₂—SiCy₃-Cp)HfMe₂; (Me₅Cp)(3-CH₂—SiCy₃-Cp)HfMe₂; (Et₂Cp)(3-CH₂—SiCy₃-Cp)HfMe₂; (Et₃Cp)(3-CH₂—SiCy₃-Cp)HfMe₂; (Et₄Cp)(3-CH₂—SiCy₃-Cp)HfMe₂; (Et₅Cp)(3-CH₂—SiCy₃-Cp)HfMe₂; (Pr₂Cp)(3-CH₂—SiCy₃-Cp)HfMe₂; (Pr₃Cp)(3-CH₂—SiCy₃-Cp)HfMe₂; (Pr₄Cp)(3-CH₂—SiCy₃-Cp)HfMe₂; (Pr₅Cp)(3-CH₂—SiCy₃-Cp)HfMe₂; (Bu₂Cp)(3-CH₂—SiCy₃-Cp)HfMe₂; (Bu₃Cp)(3-CH₂—SiCy₃-Cp)HfMe₂; (Bu₄Cp)(3-CH₂—SiCy₃-Cp)HfMe₂; (Bu₅Cp)(3-CH₂—SiCy₃-Cp)HfMe₂; (Bz₂Cp)(3-CH₂—SiCy₃-Cp)HfMe₂; (Bz₃Cp)(3-CH₂—SiCy₃-Cp)HfMe₂; (Bz₄Cp)(3-CH₂—SiCy₃-Cp)HfMe₂; (Bz₅Cp)(3-CH₂—SiCy₃-Cp)HfMe₂; (EtMe₄Cp)(3-CH₂—SiCy₃-Cp)HfMe₂; (PrMe₄Cp)(3-CH₂—SiCy₃-Cp)HfMe₂; (BuMe₄Cp)(3-CH₂—SiCy₃-Cp)HfMe₂; (BzMe₄Cp)(3-CH₂—SiCy₃-Cp)HfMe₂; (Me₄Cp-CH₂—SiMe₃)(3-CH₂—SiCy₃-Cp)HfMe₂; (Me₄Cp-CH₂—SiMe₂Ph)(3-CH₂—SiCy₃-Cp)HfMe₂; (Me₄Cp-CH₂—SiMePh₂)(3-CH₂—SiCy₃-Cp)HfMe₂; (Me₄Cp-CH₂—SiPh₃)(3-CH₂—SiCy₃-Cp)HfMe₂; (Me₄Cp-CH₂—SiMe₂Cy)(3-CH₂—SiCy₃-Cp)HfMe₂; (Me₄Cp-CH₂—SiMeCy₂)(3-CH₂—SiCy₃-Cp)HfMe₂; (Me₄Cp-CH₂—SiCy₃)(3-CH₂—SiCy₃-Cp)HfMe₂; (EtMe₃Cp)(3-CH₂—SiCy₃-Cp)HfMe₂; (PrMe₃Cp)(3-CH₂—SiCy₃-Cp)HfMe₂; (BuMe₃Cp)(3-CH₂—SiCy₃-Cp)HfMe₂; (BzMe₃Cp)(3-CH₂—SiCy₃-Cp)HfMe₂; (Me₃Cp-CH₂—SiMe₃)(3-CH₂—SiCy₃-Cp)HfMe₂; (Me₃Cp-CH₂—SiMe₂Ph)(3-CH₂—SiCy₃-Cp)HfMe₂; (Me₃Cp-CH₂—SiMePh₂)(3-CH₂—SiCy₃-Cp)HfMe₂; (Me₃Cp-CH₂—SiPh₃)(3-CH₂—SiCy₃-Cp)HfMe₂; (Me₃Cp-CH₂—SiMe₂Cy)(3-CH₂—SiCy₃-Cp)HfMe₂; (Me₃Cp-CH₂—SiMeCy₂)(3-CH₂—SiCy₃-Cp)HfMe₂; (Me₃Cp-CH₂—SiCy₃)(3-CH₂—SiCy₃-Cp)HfMe₂; (MeEtCp)(3-CH₂—SiCy₃-Cp)HfMe₂; (MePrCp)(3-CH₂—SiCy₃-Cp)HfMe₂; (MeBuCp)(3-CH₂—SiCy₃-Cp)HfMe₂; (BzMeCp)(3-CH₂—SiCy₃-Cp)HfMe₂; (EtPrCp)(3-CH₂—SiPCy-Cp)HfMe₂; (EtBuCp)(3-CH₂—SiCy₃-Cp)HfMe₂; (BzEtCp)(3-CH₂—SiCy₃-Cp)HfMe₂; (PrBuCp)(3-CH₂—SiCy₃-Cp)HfMe₂; (BzPrCp)(3-CH₂—SiCy₃-Cp)HfMe₂; (BuBzCp)(3-CH₂—SiCy₃-Cp)HfMe₂; (2-Me,3-CH₂—SiMe₃-Ind)₂HfMe₂; (2-Et,3-CH₂—SiMe₃-Ind)₂HfMe₂; (2-Pr,3-CH₂—SiMe₃-Ind)₂HfMe₂; (2-Bu,3-CH₂—SiMe₃-Ind)₂HfMe₂; (2-Ph,3-CH₂—SiMe₃-Ind)₂HfMe₂; (2-Bz,3-CH₂—SiMe₃-Ind)₂HfMe₂; (2-Me,3-CH₂—SiMe₂Ph-Ind)₂HfMe₂; (2-Et,3-CH₂—SiMe₂Ph-Ind)₂HfMe₂; (2-Pr,3-CH₂—SiMe₂Ph-Ind)₂HfMe₂; (2-Bu,3-CH₂—SiMe₂Ph-Ind)₂HfMe₂; (2-Ph,3-CH₂—SiMe₂Ph-Ind)₂HfMe₂; (2-Bz,3-CH₂—SiMe₂Ph-Ind)₂ HfMe₂; (2-Me,3-CH₂—SiMePh₂-Ind)₂HfMe₂; (2-Et, 3-CH₂—SiMePh₂-Ind)₂HfMe₂; (2-Pr,3-CH₂—SiMePh₂-Ind)₂HfMe₂; (2-Bu,3-CH₂—SiMePh₂-Ind)₂HfMe₂; (2-Ph, 3-CH₂—SiMePh₂-Ind)₂HfMe₂; (2-Bz, 3-CH₂—SiMePh₂-Ind)₂HfMe₂; (2-Me,3-CH₂—SiPh₃-Ind)₂HfMe₂; (2-Et,3-CH₂—SiPh₃-Ind)₂HfMe₂; (2-Pr,3-CH₂—SiPh₃-Ind)₂ HfMe₂; (2-Bu,3-CH₂—SiPh₃-Ind)₂HfMe₂; (2-Ph,3-CH₂—SiPh₃-Ind)₂HfMe₂; (2-Bz,3-CH₂—SiPh₃-Ind)₂HfMe₂; (2-Me,3-CH₂—SiCyMe₂-Ind)₂HfMe₂; (2-Et, 3—CH₂—SiCyMe₂-Ind)₂HfMe₂; (2-Pr,3-CH₂—SiCyMe₂-Ind)₂HfMe₂; (2-Bu,3-CH₂—SiCyMe₂-Ind)₂HfMe₂; (2-Ph,3-CH₂—SiCyMe₂-Ind)₂HfMe₂; (2-Bz,3-CH₂—SiCyMe₂-Ind)₂HfMe₂; (2-Me,3-CH₂—SiCy₂Me-Ind)₂HfMe₂; (2-Et,3-CH₂—SiCy₂Me-Ind)₂HfMe₂; (2-Pr,3-CH₂—SiCy₂Me-Ind)₂HfMe₂; (2-Bu,3-CH₂—SiCy₂Me-Ind)₂HfMe₂; (2-Ph,3-CH₂—SiCy₂Me-Ind)₂HfMe₂; (2-Bz,3-CH₂—SiCy₂Me-Ind)₂ HfMe₂; (2-Me,3-CH₂—SiCy₃-Ind)₂HfMe₂; (2-Et,3-CH₂—SiCy₃-Ind)₂HfMe₂; (2-Pr,3-CH₂—Si-

Cy$_3$-Ind)$_2$HfMe$_2$; (2-Bu,3-CH$_2$—SiCy$_3$-Ind)$_2$HfMe$_2$; (2-Ph, 3-CH$_2$—SiCy$_3$-Ind)$_2$HfMe$_2$; (2-Bz,3-CH$_2$—SiCy$_3$-Ind)$_2$HfMe$_2$; (2-Me,3-CH$_2$—SiMe$_3$-Ind)(3-CH$_2$—SiMe$_3$-Cp)HfMe$_2$; (2-Et, 3-CH$_2$—SiMe$_3$-Ind)(3-CH$_2$—SiMe$_3$-Cp)HfMe$_2$; (2-Pr,3-CH$_2$—SiMe$_3$-Ind)(3-CH$_2$—SiMe$_3$-Cp)HfMe$_2$; (2-Bu,3-CH$_2$—SiMe$_3$-Ind)(3-CH$_2$—SiMe$_3$-Cp)HfMe$_2$; (2-Pn,3-CH$_2$—SiMe$_3$-Ind)(3-CH$_2$—SiMe$_3$-Cp)HfMe$_2$; (2-Hx,3-CH$_2$—SiMe$_3$-Ind)(3-CH$_2$—SiMe$_3$-Cp)HfMe$_2$; (2-Ph,3-CH$_2$—SiMe$_3$-Ind)(3-CH$_2$—SiMe$_3$-Cp)HfMe$_2$; (2-Me,3-CH$_2$—SiMe$_2$Ph-Ind)(3-CH$_2$—SiMe$_3$-Cp)HfMe$_2$; (2-Et, 3-CH$_2$—SiMe$_2$Ph-Ind)(3-CH$_2$—SiMe$_3$-Cp)HfMe$_2$; (2-Pr,3-CH$_2$—SiMe$_2$Ph-Ind)(3-CH$_2$—SiMe$_3$-Cp)HfMe$_2$; (2-Bu,3-CH$_2$—SiMe$_2$Ph-Ind)(3-CH$_2$—SiMe$_3$-Cp)HfMe$_2$; (2-Pn, 3-CH$_2$—SiMe$_2$Ph-Cp)HfMe$_2$; (2-Hx,3-CH$_2$—SiMe$_2$Ph-Ind)(3-CH$_2$—SiMe$_3$-Cp)HfMe$_2$; (2-Ph,3-CH$_2$—SiMe$_2$Ph-Ind)(3-CH$_2$—SiMe$_3$-Cp)HfMe$_2$; (2-Me,3-CH$_2$—SiMePh$_2$-Ind)(3-CH$_2$—SiMe$_3$-Cp)HfMe$_2$; (2-Et,3-CH$_2$—SiMePh$_2$-Ind)(3-CH$_2$—SiMe$_3$-Cp)HfMe$_2$; (2-Pr, 3-CH$_2$—SiMePh$_2$-Ind)(3-CH$_2$—SiMe$_3$-Cp)HfMe$_2$; (2-Bu,3-CH$_2$—SiMePh$_2$-Ind)(3-CH$_2$—SiMe$_3$-Cp)HfMe$_2$; (2-Pn,3-CH$_2$—SiMePh$_2$-Ind)(3-CH$_2$—SiMe$_2$Ph-Cp)HfMe$_2$; (2-Hx, 3-CH$_2$—SiMePh$_2$-Ind)(3-CH$_2$—SiMe$_3$-Cp)HfMe$_2$; (2-Ph,3-CH$_2$—Si MePh$_2$-Ind)(3-CH$_2$—SiMe$_3$-Cp)HfMe$_2$; (2-Me,3-CH$_2$—SiPh$_3$-Ind)(3-CH$_2$—SiMe$_3$-Cp)HfMe$_2$; (2-Et,3-CH$_2$—SiPh$_3$-Ind)(3-CH$_2$—SiMe$_3$-Cp)HfMe$_2$; (2-Pr,3-CH$_2$—SiPh$_3$-Ind)(3-CH$_2$—SiMe$_3$-Cp)HfMe$_2$; (2-Bu,3-CH$_2$—SiPh$_3$-Ind)(3-CH$_2$—SiMe$_3$-Cp)HfMe$_2$; (2-Pn,3-CH$_2$—SiPh$_3$-Ind)(3-CH$_2$—SiMe$_2$Ph-Cp)HfMe$_2$; (2-Hx,3-CH$_2$—SiPh$_3$-Ind)(3-CH$_2$—SiMe$_3$-Cp)HfMe$_2$; (2-Ph,3-CH$_2$—Si Phi-Ind)(3-CH$_2$—SiMe$_3$-Cp)HfMe$_2$; (2-Me,3-CH$_2$—SiCyMe$_2$-Ind)(3-CH$_2$—SiMe$_3$-Cp)HfMe$_2$; (2-Et,3-CH$_2$—SiCyMe$_2$-Ind)(3-CH$_2$—SiMe$_3$-Cp)HfMe$_2$; (2-Pr,3-CH$_2$—SiCyMe$_2$-Ind)(3-CH$_2$—SiMe$_3$-Cp)HfMe$_2$; (2-Bu,3-CH$_2$—SiCyMe$_2$-Ind)(3-CH$_2$—SiMe$_3$-Cp)HfMe$_2$; (2-Pn,3-CH$_2$—SiCyMe$_2$-Ind)(3-CH$_2$—SiMe$_2$Ph-Cp)HfMe$_2$; (2-Hx,3-CH$_2$—SiCyMe$_2$-Ind)(3-CH$_2$—SiMe$_3$-Cp)HfMe$_2$; (2-Ph,3-CH$_2$—SiCyMe$_2$-Ind)(3-CH$_2$—SiMe$_3$-Cp)HfMe$_2$, and the alkyl or halide versions thereof where the Me$_2$ is substituted with Bz$_2$, Et$_2$, Phe, Cl$_2$, Br$_2$ or I$_2$.

Unbridged Zirconium Metallocene

In one or more embodiments, the unbridged zirconium metallocene compound may be represented by the formula Cp$^A$Cp$^B$ZrX'$_n$, wherein Cp$^A$ and Cp$^B$ may each be independently selected from the group consisting of cyclopentadienyl ligands and ligands isolobal to cyclopentadienyl, either or both Cp$^A$ and Cp$^B$ may contain heteroatoms, and either or both Cp$^A$ and Cp$^B$ may be substituted; wherein X' may be any leaving group; wherein n is 0, 1, or 2.

Unbridged zirconium metallocenes useful herein are further represented by the formula (C):

Cp$_m$ZrX$_q$     (C), wherein each Cp is, independently, a cyclopentadienyl group (such as cyclopentadiene, indene or fluorene) which may be substituted or unsubstituted, X is a leaving group (such as a halide, a hydride, an alkyl group, an alkenyl group or an arylalkyl group), and m=1 or 2, n=0, 1, 2 or 3, q=0, 1, 2, or 3, and the sum of m+q is equal to the oxidation state of the transition metal. In some embodiments, m is 2.

In an embodiment each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system). In particular embodiments, each X is independently selected from halides, aryls and C$_1$ to C$_5$ alkyl groups. In particular embodiments, each X is a phenyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In particular embodiments, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, including two adjacent R groups, may be joined to form a ring structure having from 3 to 30 atoms selected from carbon, nitrogen, oxygen, phosphorus, silicon, germanium, aluminum, boron or a combination thereof.

In an embodiment of the Cp group, the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a C$_1$ to C$_{20}$ hydrocarbyl substituted with an N, O, S and or P heteroatom or heteroatom containing group (typically having up to 12 atoms, including the N, O, S and P heteroatoms).

Non-limiting examples of Cp groups include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example tetrahydroindenyl ligands. In another embodiment, each Cp may, independently comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins and other polyazamacrocycles.

In another aspect, the unbridged metallocene catalyst component is represented by the formula (D):

$$Cp^A Cp^B ZrX_q \qquad (D),$$

wherein X and q are as described above, preferably q is 1 or 2, and each $Cp^A$ and $Cp^B$ in formula (D) is independently as defined for Cp above and may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (D) may be unsubstituted or substituted with any one or combination of substituent groups R. Non-limiting examples of substituent groups R as used in structure (D) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular, non-limiting examples of alkyl substituents R associated with formula (D) includes methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example, 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R, such as 1-butanyl, may form a bonding association to the element M.

The ligands $Cp^A$ and $Cp^B$ of formula (D) are different from each other in one embodiment, and the same in another embodiment.

It is contemplated that the metallocene catalyst components described above include their structural or optical or enantiomeric isomers (racemic mixture), and may be a pure enantiomer in one embodiment.

The unbridged metallocene catalyst component may comprise any combination of any embodiments described herein.

Suitable unbridged metallocenes useful herein include, but are not limited to, the metallocenes disclosed and referenced in the U.S. patents cited above, as well as those disclosed and referenced in U.S. Pat. Nos. 7,179,876; 7,169,864; 7,157,531; 7,129,302; 6,995,109; 6,958,306; 6,884,748; 6,689,847; U.S. Publication 2007/0055028, and PCT Publication Nos. WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; U.S. Publication No. 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary unbridged zirconium metallocene compounds useful herein are include bis(cyclopentadienyl)zirconium dichloride; bis(cyclopentadienyl)zirconium dimethyl; bis(n-butylcyclopentadienyl)zirconium dichloride; bis(n-butylcyclopentadienyl)zirconium dimethyl; bis(pentamethylcyclopentadienyl)zirconium dichloride; bis(pentamethylcyclopentadienyl)zirconium dimethyl; bis(pentamethylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-phenylcyclopentadienyl)zirconium dichloride; bis(1-methyl-3-phenylcyclopentadienyl)zirconium dimethyl; bis(1-methyl-3-n-butylcyclopentadienyl)zirconium dimethyl; bis(indenyl)zirconium dichloride, bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl) zirconium dichloride; (n-propyl cyclopentadienyl)(pentamethyl cyclopentadienyl)zirconium dimethyl; rac/meso-(1-Ethylindenyl)zirconium dichloride; rac/meso-(1-Ethylindenyl)zirconium dimethyl; rac/meso-(1-methylindenyl)zirconium dichloride; rac/meso-(1-methylindenyl)zirconium dimethyl; rac/meso-(1-propylindenyl)zirconium dichloride; rac/meso-(1-propylindenyl)zirconium dimethyl; rac/meso-(1-butylindenyl)zirconium dichloride; rac/meso-(1-butylindenyl)zirconium dimethyl; meso-(1ethylindenyl) zirconium dichloride; meso-(1ethylindenyl) zirconium dimethyl; (1-methylindenyl)(pentamethyl cyclopentadienyl) zirconium dichloride; and (1-methylindenyl)(pentamethyl cyclopentadienyl) zirconium dimethyl.

In one or more embodiments, useful unbridged metallocene compounds include bis(cyclopentadienyl)zirconium dichloride; bis(n-butylcyclopentadienyl)zirconium dichloride; bis(n-butylcyclopentadienyl)zirconium dimethyl; bis(pentamethylcyclopentadienyl)zirconium dichloride; bis(pentamethylcyclopentadienyl)zirconium dimethyl; bis(pentamethylcyclopentadienyl)hafnium dichloride; bis(pentamethylcyclopentadienyl)zirconium dimethyl; bis(1- methyl-3-n-butylcyclopentadienyl)zirconium dichloride; bis (1-methyl-3-n-butylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride, bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl) zirconium dichloride; (n-propyl cyclopentadienyl)(pentamethyl cyclopentadienyl)zirconium dimethyl; Rac/meso-(1-Ethylindenyl)zirconium dichloride; Rac/meso-(1-methylindenyl)zirconium dichloride; Rac/meso-(1-propylindenyl)zirconium dichloride; Meso-(1ethylindenyl) zirconium dichloride, and (1-Methylindenyl)(pentamethyl cyclopentadienyl).

For purposes of this specification one metallocene catalyst compound is considered different from another if they differ by at least one atom. For example "bisindenyl zirconium dichloride" is different from "(indenyl)(2-methylindenyl) zirconium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl. Thus, as used herein, a single, bridged, asymmetrically substituted metallocene catalyst component having a racemic and/or meso isomer does not, itself, constitute two different bridged, metallocene catalyst components.

Catalyst Ratios

In one or more embodiments, two transition metal compounds may be used in any ratio. In particular embodiments, molar ratios of (A) bridged hafnium transition metal compound to (B) unbridged transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalyst compounds chosen, the method of activation, and the end product desired. In a particular embodiment, when using the two catalyst compounds, where both are activated with the same activator, useful mole percents, based upon the molecular weight of the catalyst compounds, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Support Material

In embodiments of the invention herein, the catalyst systems comprise a support material. In particular embodiments, the support material is a porous support material, for example, talc, and inorganic oxides. Other support materials include zeolites, clays, organoclays, or any other organic or inorganic support material, or mixtures thereof. As used herein, "support" and "support material" are used interchangeably.

In one or more embodiments, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Particular support materials include $Al_2O_3$, $ZrO_2$, $SiO_2$, and combinations thereof, more preferably, $SiO_2$, $Al_2O_3$, or $SiO_2/Al_2O_3$.

In one or more embodiments, the support material, particularly where it is an inorganic oxide, has a surface area in the range of from about 10 $m^2$/g to about 700 $m^2$/g, pore volume in the range of from about 0.1 cc/g to about 4.0 cc/g, and average particle size in the range of from about 5 μm to about 500 μm. In other embodiments, the surface area of the support material is in the range of from about 50 $m^2$/g to about 500 $m^2$/g, pore volume of from about 0.5 cc/g to about 3.5 cc/g, and average particle size of from about 10 μm to about 200 μm. In yet other embodiments, the surface area of the support material is in the range of from about 100 $m^2$/g to about 400 $m^2$/g, pore volume from about 0.8 cc/g to about 3.0 cc/g, and average particle size is from about 5 μm to about 100 μm. The average pore size of the support material useful in the invention is in the range of from 10 to 1,000 Å, in other embodiments 50 to about 500 Å, and in other embodiments 75 to about 350 Å. In some embodiments, the support material is a high surface area, amorphous silica (surface area ≥300 $m^2$/gm, pore volume ≥1.65 $cm^3$/gm), and is marketed under the tradenames of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably, at least about 600° C. When the support material is silica, it is typically heated to at least 200° C., such as about 200° C. to about 850° C., or at about 600° C.; and for a time of about 1 minute to about 100 hours, from about 12 hours to about 72 hours, or from about 24 hours to about 60 hours. The calcined support material of particular embodiments has at least some reactive hydroxyl (OH) groups.

In certain embodiments, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately from 0.19 to 19 wt %, alternately from 0.6 to 3.5 wt %, based upon the weight of the support.

The above two metal catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used provided that the total amount of solid complex does not exceed the support's pore volume.

Activators

The supported catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Particular activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Particular activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl)pyrrolidinium; and [Me$_3$NH$^+$][B(C$_6$F$_5$)$_4^-$], 1-(4-(tris(pentafluoropheny0borate)-2,3,5,6-tetrafluorophenyl) pyrrolidinium; and sodium tetrakis(pentafluorophenyl) borate, potassium tetrakis(pentafluorophenyl)borate, 4-(tris (pentafluoropheny0borate)-2,3,5,6-tetrafluoropyridinium, solidium tetrakis(perfluorophenyl)aluminate, potassium terakis(pentafluorophenyl), and N,N-dimethylanilinium tetrakis(perfluorophenyl)aluminate.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate ranges include from 0.1:1 to 100:1, alternately from 0.5:1 to 200:1, alternately from 1:1 to 500:1 alternately from 1:1 to 1000:1. A particularly useful range is from 0.5:1 to 10:1, or 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, and diethyl zinc.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-isoprenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Particular aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z—Al—)_yO—)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal compound components can be combined to form a mixed catalyst system. The two or more metal compounds can be added together in a desired ratio when combined, contacted with an activator, or contacted with a support material or a supported activator. The metal compounds may be added to the mixture sequentially or at the same time.

More complex procedures are possible, such as addition of a first metal compound to a slurry including a support or a supported activator mixture for a specified reaction time, followed by the addition of the second metal compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal compound may be supported via contact with a support material for a reaction time. The resulting supported catalyst composition may then be mixed with mineral oil to form a slurry, which may or may not include an activator. The slurry may then be admixed with a second metal compound prior to introduction of the resulting mixed catalyst system to a polymerization reactor. The second metal compounds may be admixed at any point prior to introduction to the reactor, such as in a polymerization feed vessel or in-line in a catalyst delivery system.

The mixed catalyst system may be formed by combining a first metal compound (for example a metal compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal compound, followed by, or simultaneous to combining with a second metal compound (for example, a metal compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal compound in a slurry, the slurry comprising mineral or silicon oil, with a second metal compound that is not supported and not combined with additional activator, where the second metal compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal compound is combined with an activator and a first diluent to form a catalyst slurry that is then combined with a support material. Until such contact is made, the support particles are preferably not previously activated. The first metal compound can be in any desirable form such as a dry powder, suspension in a diluent, solution in a diluent, liquid, etc. The catalyst slurry and support particles are then mixed thoroughly, in one embodiment at an elevated temperature, so that both the first metal compound and the activator are deposited on the support particles to form a support slurry.

After the first metal compound and activator are deposited on the support, a second metal compound may then be combined with the supported first metal compound, wherein the second is combined with a diluent comprising mineral or silicon oil by any suitable means either before, simultaneous to, or after contacting the second metal compound with the supported first metal compound. In one embodiment, the first metal compound is isolated form the first diluent to a dry state before combining with the second metal compound. Preferably, the second metal compound is not activated, that is, not combined with any activator, before being combined with the supported first metal compound. The resulting solids slurry (including both the supported first and second metal compounds) is then preferably, mixed thoroughly at an elevated temperature.

A wide range of mixing temperatures may be used at various stages of making the mixed catalyst system. For example, in a specific embodiment, when the first metal compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal compound deposited thereto. The first diluent can then be removed from the first support slurry to provide a dried supported first catalyst compound. For example, the first diluent can be removed under vacuum or by nitrogen purge.

Next, the second metal compound is combined with the activated first metal compound in the presence of a diluent comprising mineral or silicon oil in one embodiment. Preferably, the second metal compound is added in a molar ratio to the first metal compound in the range from 1:1 to 3:1. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The metallocene compound may be the first or second compound, typically the second compound.

Polymerization Process

The polyethylene compositions of the invention may be prepared by a polymerization processes where monomer (such as ethylene), and, optionally, comonomer (such as hexene), are contacted with a supported catalyst system; e.g. the catalyst system including an unbridged hafnium metallocene compound, an unbridged zirconium metallocene compound, an activator, and a support material as described above.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the invention, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a particular embodiments, one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Particular diolefin monomers useful in this invention include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further desirable that the diolefin monomers be selected from alpha, omega-diene monomers (i.e., di-vinyl monomers). In particular, the diolefin monomers are linear di-vinyl monomers, most preferably, those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Exemplary cyclic dienes include cyclopentadiene, vinylnorbornene, norbomadiene, ethylidene norbornene, divinylbenzene, dicyclopentadiene or higher ring containing diolefins with or without substituents at various ring positions.

In particular embodiments, the process includes the polymerization of ethylene and at least one comonomer having from 3 to 8 carbon atoms, preferably, 4 to 8 carbon atoms. The co-monomers may include propylene, 1-butene, 4-methyl-1-pentene, 3-methyl-1-pentene, 1-hexene and 1-octene, the most preferred being 1-hexene, 1-butene and 1-octene.

In particular embodiments, the co-monomers are selected from the group consisting of propylene, 1-butene, 1-pentene, 3-methyl-1-pentene, 4-methyl-1-pentene, 1-hexene, 1-octene, 1-decene, and combinations thereof.

Polymerization processes of this invention can be carried out in any manner known in the art. Any suspension, homogeneous, bulk, solution, slurry, or gas phase polymerization process known in the art can be used. These processes can be run in a batch, semi-batch, or continuous mode. Gas phase polymerization processes and slurry processes are preferred. (A homogeneous polymerization process is a process where at least 90 wt % of the product is soluble in the reaction media.) A bulk homogeneous process is particularly preferred. (A bulk process is a process where monomer concentration in all feeds to the reactor is 70 vol % or more.) Alternately, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof.

In a preferred embodiment, aliphatic hydrocarbon solvents are used as the solvent, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably, less than 0.5 wt %, preferably, less than 0 wt % based upon the weight of the solvents.

Gas Phase Polymerization

In one or more embodiments, in a fluidized gas bed process is used for producing the polyethylene compositions of the invention. Accordingly, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

End Uses

The polyethylene compositions disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the invention, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In particular embodiments, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

Experimental

All manipulations were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), diphenylsilyl dichloride ($Ph_2SiCl_2$), iodomethane, indene, methyllithium (1.6 M solution in diethyl ether), methylmagnesium bromide (3.0 M solution in diethyl ether) and silver triflate were purchased from Sigma-Aldrich. Hafnium tetrachloride ($HfCl_4$) 99+% and (trimethylsilyl)methyl trifluoromethanesulfonate were procured from Strem Chemicals and TCI America, respectively, and used as received. Potassium cyclopentadienide (KCp) was prepared according to the literature procedure. 1-Methylindene and lithium-1-methylindene were prepared according to the literature methods. The $^1H$ NMR measurements were recorded on a 400 MHz Bruker spectrometer.

Synthesis of trimethylsilylmethyl cyclopentadiene, $Me_3SiCH_2CpH$

A neat trimethylsilylmethyl trifluoromethanesulfonate (25.0 g, 105.8 mmol) was dissolved in 300 mL of diethyl ether and cooled to $-25°$ C.; to this a solid potassium cyclopentadienide (11.14 g, 106.9 mmol) was slowly added over a period of 10-15 minutes. The resulting mixture was stirred overnight at room temperature. Insoluble materials were filtered out. Volatiles from the reaction mixture were carefully removed under dynamic vacuum to avoid evaporating the volatile trimethylsilylmethyl cyclopentadiene, $Me_3SiCH_2CpH$. The reaction flask (250 mL round bottom flask) and frit with celite were weighted to calculate yield of the product after extraction. The crude materials were then extracted into pentane (3×50 mL) and used without any further purification. The yield is calculated as 15.47 g (95.2%). The $^1H$ NMR spectrum was recorded for the crude material to ensure the product formation. $^1H$ NMR (400 MHz, C6D6): δ −0.05 (9H, s, Si—$CH_3$), 1.77 (2H, d, $J_{HH}$=1.2 Hz, $Me_3Si$—$CH_2$), 2.83 (1H, sex, $J_{HH}$=1.5 Hz, Cp-CH), 5.80-6.49 (4H, m, Cp-CH) ppm.

Synthesis of Lithium trimethylsilylmethyl cyclopentadienide, $Me_3SiCH_2CpLi$

A hexane solution of n-butyl lithium (41.5 mL, 103.8 mmol, 2.5 M solution) was added drop wise to a precooled solution (1:1 mixture of pentane and diethyl ether, 200 mL) of the $Me_3SiCH_2CpH$ (15.47 g, 101.7 mmol), which was prepared above, over a period of 40-50 minutes at $-25°$ C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of $Me_3SiCH_2CpLi$ in 13.6 g (84.6%) yield. $^1H$ NMR (400 MHz, THF-$d_8$): δ −0.09 (9H, s, Si—$CH_3$), 1.84 (2H, s, $Me_3Si$—$CH_2$), 5.36 (2H, t, $J_{HH}$=2.6 Hz, Cp-CH), 5.47 (2H, t, $J_{HH}$=2.6 Hz, Cp-CH) ppm.

Synthesis of Bis-(trimethylsilylmethyl cyclopentadienide)hafnium dichloride, $(Me_3SiCH_2Cp)_2HfCl_2$ A solid $HfCl_4$ (1.011 g, 3.16 mmol) was slurried in precooled diethyl ether (30 mL) at $-25°$ C., and to this the solid $Me_3SiCH_2CpLi$ (1.0 g, 6.3 mmol), which was prepared above, was added over a period of 3-5 minutes. The resulting mixture was stirred overnight at room temperature. All volatiles were removed in vacuo and the crude materials were subsequently extracted into dichloromethane. Solvents were removed under reduced pressure resulted spectroscopically pure $(Me_3SiCH_2Cp)_2HfCl_2$ as a colorless solid in 1.13 g (70%) yield. $^1H$ NMR (400 MHz C6D6): δ −0.11 (18H, s, $SiMe_3$—$CH_3$), 2.18 (4H, s, $Me_3Si$—$CH_2$), 5.68 (8H, s, Cp-CH) ppm.

Synthesis of Bis-(trimethylsilylmethyl cyclopentadienyl)hafnium dimethyl, $(Me_3SiCH_2Cp)_2HfMe_2$ An ethereal solution of MeLi (2.56 mL, 4.1 mmol) was added drop wise to a precooled diethyl ether solution of the $(Me_3SiCH_2Cp)_2HfCl_2$ (1.12 g, 2.03 mmol), which was prepared above, over a period of 3-5 minutes at $-25°$ C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of $(Me_3SiCH_2Cp)_2HfMe_2$ in 875 mg (84.2%) yield. $^1H$ NMR (400 MHz, $C_6D_6$): δ −0.23 (6H, s, Hf—$CH_3$), 0.02 (18H, s, $SiMe_3$—$CH_3$), 1.89 (4H, s, $Me_3Si$—$CH_2$), 5.54-5.48 (8H, m, Cp-CH) ppm.

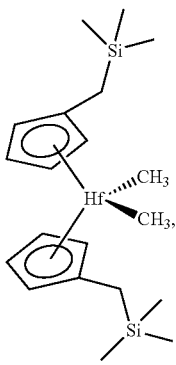

Synthesis of
Rac-meso-bis(1-ethyl-indenyl)zirconium dimethyl,
(1-EthInd)$_2$ZrMe$_2$ In a 500 mL round bottom flask, a solid ZrCl$_4$ (9.42 g, 40.4 mmol) was slurried with 250 mL of dimethoxyethane (DME) and cooled to −25° C. A solid lithium-1-ethyl-indenyl (11.0 g, 80.8 mmol) was added over a period of 5-10 minutes. The orange-yellow reaction mixture was gradually warmed to room temperature and subsequently heated at 80° C. for 1 hour to ensure the formation of bis(1-ethyl-indenyl)zirconium dichloride in-situ. While heating resulting mixture, it was clear at first and then byproduct (LiCl) was precipitated out over a course reaction, revealing the product formation. Without any further purification, reaction mixture of bis(1-ethyl-indenyl)zirconium dichloride was cooled to −25° C., and to this an ethereal solution of methylmagnesium bromide (27.0 mL, 80.8 mmol, 3.0 M solution in diethyl ether) was added over a period of 10-15 minutes. The resulting mixture was slowly turned pale yellow and then maroon over a course of reaction and continuously stirred overnight at room temperature. Volatiles were removed in vacuo. The crude materials were then extracted with hexane (50 mL×5), and solvent removal afforded to the formation of (1-EthInd)$_2$ZrMe$_2$ as an off-white solid in 13.6 g (89%) yield. The $^1$H NMR spectrum of final material integrated a ~0.8:1 ratio of rac/meso isomers. $^1$H NMR (400 MHz, C$_6$D$_6$): δ −1.33 (3H, s, meso), −0.84 (4.77H, s, rac), −0.34 (3H, s, meso), 2.14 (11.42H. overlapping s), 5.47-5.42 (6.41H, m), 6.95-6.88 (7.34H, m), 7.14-7.06 (3.45H, m), 7.30-7.27 (3.35H, m) ppm.

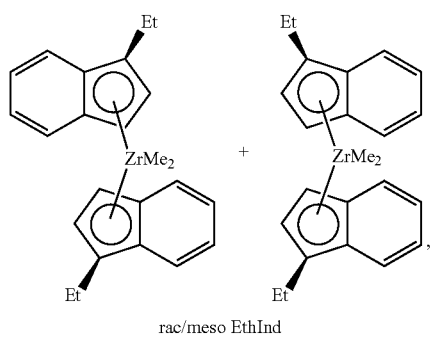

rac/meso EthInd

Preparation of (Me$_3$SiCH$_2$Cp)$_2$HfMe$_2$/(1-EthInd)$_2$ZrMe$_2$ Supported Catalyst To a stirred vessel 1400 g of toluene was added along with 925 g of methylaluminoxane (30 wt % in toluene). To this solution 734 g of ES70—875° C. calcined silica was added. The mixture was stirred for three hours at 100° C. after which the temperature was reduced and the reaction was allowed to cool to ambient temperature. Bis-(trimethylsilyl-methyl cyclopentadienyl) hafnium (IV) dimethyl ((Me$_3$SiCH$_2$Cp)$_2$HfMe$_2$) (16.35 g, 32.00 mmol) and bis-ethylindenyl zirconium (IV) dimethyl ((1-EthInd)$_2$ZrMe$_2$) (3.26 g, 8.00 mmol) were then dissolved in toluene (250 g) and added to the vessel, which was stirred for two more hours. The mixing speed was then reduced and stirred slowly while drying under vacuum for 60 hours, after which 1038 g of light yellow silica was obtained.

Preparation of (nPrCp)$_2$HfMe$_2$/EthInd Supported Catalyst

Supported (nPrCp)$_2$HfMe$_2$/EthInd was made according to the general procedures described in U.S. Pat. No. 7,179,876 using a methylalumoxane treated silica (SMAO-ES70—875 C) prepared as follows: In a 4 L stirred vessel in the drybox methylaluminoxane (MAO) (30 wt % in toluene) was added along with 2400 g of toluene. This solution was then stirred at 60 RPM for 5 minutes. Next, ES-70™ silica (PQ Corporation, Conshohocken, Pa.) that had been calcined at 875° C. was added to the vessel. This slurry was heated at 100° C. and stirred at 120 RPM for 3 hours. The temperature was then lowered to 25° C. and cooled to temperature over 2 hours. Once cooled, the vessel was set to 8 RPM and placed under vacuum for 72 hours. After emptying the vessel and sieving the supported MAO, 1079 g was collected.

Polymerization in Gas-Phase Reactor

Three polymerizations were run employing the (Me$_3$SiCH$_2$Cp)$_2$HfMe$_2$/(1-EthInd)$_2$ZrMe$_2$ supported catalyst (Polymerization 1, 2 & 3), and one polymerization was conducted employing the (nPrCp)2HfMe2 supported catalyst (Polymerization 4). Each polymerization was performed in an 18.5 foot tall gas-phase fluidized bed reactor with a 10 foot body and an 8.5 foot expanded section. Cycle and feed gases were fed into the reactor body through a perforated distributor plate, and the reactor was controlled at 300 psi and 70 mol % ethylene. The reactor temperature was maintained at 185° F. throughout each of the polymerizations by controlling the temperature of the cycle gas loop. Each catalyst was delivered in a mineral oil slurry containing 20 wt % supported catalyst. Hydrogen was lowered and hexene was increased relative to standard (nPrCp)2HfMe2 catalyst. Specific information relevant to each polymerization is provided in Table I below.

TABLE I

| Polymerization Polymer Product | 1 Inventive A | 2 Inventive B | 3 Inventive C | 4 Control D |
|---|---|---|---|---|
| PROCESS DATA | | | | |
| H2 conc. (molppm) | 250 | 244 | 205 | 348 |
| C6/C2 Ratio (mol %/mol %) | 0.014 | 0.014 | 0.013 | 0.013 |
| Comonomer conc. (mol %) | 0.95 | 0.95 | 0.93 | 0.90 |
| C2 conc. (mol %) | 70.0 | 69.8 | 69.8 | 70 |
| Comonomer/C2 Flow Ratio | 0.080 | 0.077 | 0.080 | 0.079 |
| H2/C2 Ratio (ppm/mol %) | 3.6 | 3.5 | 2.9 | 5.0 |
| Rx. Pressure SP (psig) | 300 | 300 | 300 | 300 |
| Reactor Temp SP (F.) | 185 | 185 | 185 | 185 |

TABLE I-continued

| Polymerization Polymer Product | 1 Inventive A | 2 Inventive B | 3 Inventive C | 4 Control D |
|---|---|---|---|---|
| Avg. Bedweight (lb) | 383 | 377 | 372 | 322 |
| Production (lb/hr) | 72 | 74 | 70 | 70 |
| Residence Time (hr) | 5.3 | 5.1 | 5.3 | 4.6 |
| Avg Velocity (ft/s) | 2.25 | 2.25 | 2.25 | 2.25 |
| Catalyst Slurry Feed (cc/hr) or Secs/Shot | 16.5 | 16.5 | 16.8 | 5.015 |
| Catalyst Slurry Conc. (wt frac.) | 0.2 | 0.2 | 0.2 | 0.2 |
| Catalyst Feed (g/hr) | 3.111 | 3.113 | 3.113 | 5.015 |
| Cat Activity (g poly/g cat) | 10477 | 10737 | 9946 | 6314 |
| Melt Index (MI) (g/10 min) | 0.98 | 1.15 | 0.72 | 1.04 |
| HLMI (g/10 min) | 22.56 | 28.74 | 16.15 | 23.32 |
| HLMI/MI Ratio | 22.96 | 24.88 | 22.56 | 22.43 |
| Gradient Density (g/cc) | 0.9178 | 0.9197 | 0.9175 | 0.9180 |
| Bulk Density (g/cc) | 0.4382 | 0.4482 | 0.4541 | 0.4487 |

Polymer Properties

The polymer products prepared above were tested for various properties using the techniques described herein. Namely, melt properties were determined according to ASTM D 1238 as set forth above. Mw, Mn, Mz, $g'_{(vis)}$, RCI,m, CDR,m, and % hexene were obtained from 4D GPC analysis using the techniques and calculations provided above. T75-T25 was measured and calculated using the techniques described herein relative to TREF. The results of these tests and manipulations are provided in Table II below.

TABLE II

| Polymer Product | Inventive A | Inventive B | Inventive C | Control D |
|---|---|---|---|---|
| PROPERTY | | | | |
| MI (dg/min) | 0.98 | 1.1 | 0.72 | 1.02 |
| MIR | 22.96 | 24.88 | 22.56 | 22.4 |
| Mw (g/mol) | 115805 | 115490 | 124365 | 121181 |
| Mn (g/mol) | 20356 | 19728 | 24884 | 28010 |
| Mz (g/mol) | 282760 | 317422 | 294283 | 262225 |
| Mz/Mn | 13.9 | 16.1 | 11.83 | 9.36 |
| Mw/Mn | 5.69 | 5.85 | 5 | 4.33 |
| Mz/Mw | 2.44 | 2.75 | 2.37 | 2.16 |
| g' (vis) | 1.0 | 0.98 | 0.997 | 1 |
| RCI,m (kg/mol) | 72.2 | 94.1 | 86.1 | 75 |
| CDR2,m | 1.42 | 1.58 | 1.47 | 1.53 |
| Hexene (%) | 8.3 | 8.07 | 8.55 | 7.88 |
| $T_{75} - T_{25}$ (° C.) | na | na | na | Na |

The polymer products prepared above were analyzed by $^1$H NMR to determine internal unsaturations using the techniques described herein.

TABLE III

| Polymer Product | Inventive A | Inventive B | Inventive C | Control D |
|---|---|---|---|---|
| Unsaturations per 1000 C | | | | |
| Vy1 and Vy2 (I) | 0.05 | 0.07 | 0.06 | 0.02 |
| Vy5 (T) | 0.02 | 0.04 | 0.03 | 0.01 |
| Tri-substituted olefins (T1) | 0.17 | 0.16 | 0.17 | 0.06 |
| Vinyls (T) | 0.02 | 0.03 | 0.01 | 0.01 |
| Vinylidenes (T) | 0.02 | 0.03 | 0.02 | 0.01 |
| Total internal unsaturations | 0.22 | 0.23 | 0.23 | 0.08 |
| Total unsaturations | 0.28 | 0.33 | 0.29 | 0.11 |

The polymer products were also analyzed using cross-fractionation chromatography to determine $Mw_1$, $Mw_2$, $Tw_1$, and $Tw_2$ as described above. The results of these tests and manipulations are provided in Table IV below. In addition, cross-fractionation chromatography was similarly performed and $Mw_1$, $Mw_2$, $Tw_1$, and $Tw_2$ were obtained for various commercially-available polymers to provide further comparative data.

TABLE IV

| Polymer | $Mw_1$ | $Mw_2$ | $Tw_1$ | $Tw_2$ | $Mw_1/Mw_2$ | $Tw_1 - Tw_2$ | $(\log(Mw_1/Mw_2))/(Tw_1 - Tw_2)$ |
|---|---|---|---|---|---|---|---|
| Inventive A | 181,658 | 114,915 | 65.5 | 88.6 | 1.58 | −23.0 | −0.0086 |
| Inventive B | na | na | na | na | na | na | na |
| Inventive C | 209,287 | 116,760 | 67.7 | 89.6 | 1.79 | −21.9 | −0.0116 |
| Control D | na | na | na | na | na | na | na |
| Exceed 1018 (919/1.0/16) | 163,239 | 156,716 | 72.4 | 86.9 | 1.04 | −14.5 | −0.0012 |
| Enable 2010 (920/1.1/34) | 103,550 | 136,434 | 75.9 | 82.5 | 0.76 | −6.7 | 0.0179 |
| Evolue 3010 (926/0.8/n.a.) | 148,115 | 166,038 | 60.3 | 88.4 | 0.89 | −28.1 | 0.0018 |
| Elite 5400 (918/1.1/32) | 174,160 | 109,611 | 62.0 | 85.8 | 1.59 | −23.8 | −0.0085 |
| Dowlex 2045 (920/1.0/29) | 117,305 | 238,061 | 66.4 | 88.0 | 0.49 | −21.6 | 0.0142 |
| Borstar FB 2230 (923/0.2/110) | 268,435 | 371,505 | 53.5 | 91.4 | 0.72 | −37.9 | 0.0037 |

The polymer Dowlex™ 2045 polyethylene, Borstar™ FB2230 polyethylene, Evolue™ 3010 polyethylene, and Elite™ 5400 polyethylene are commercially available. Exceed™ 1018 and Enable™ 2010 polyethylenes are obtained from ExxonMobil Chemical Company (Baytown, Tex.).

Figure 2:
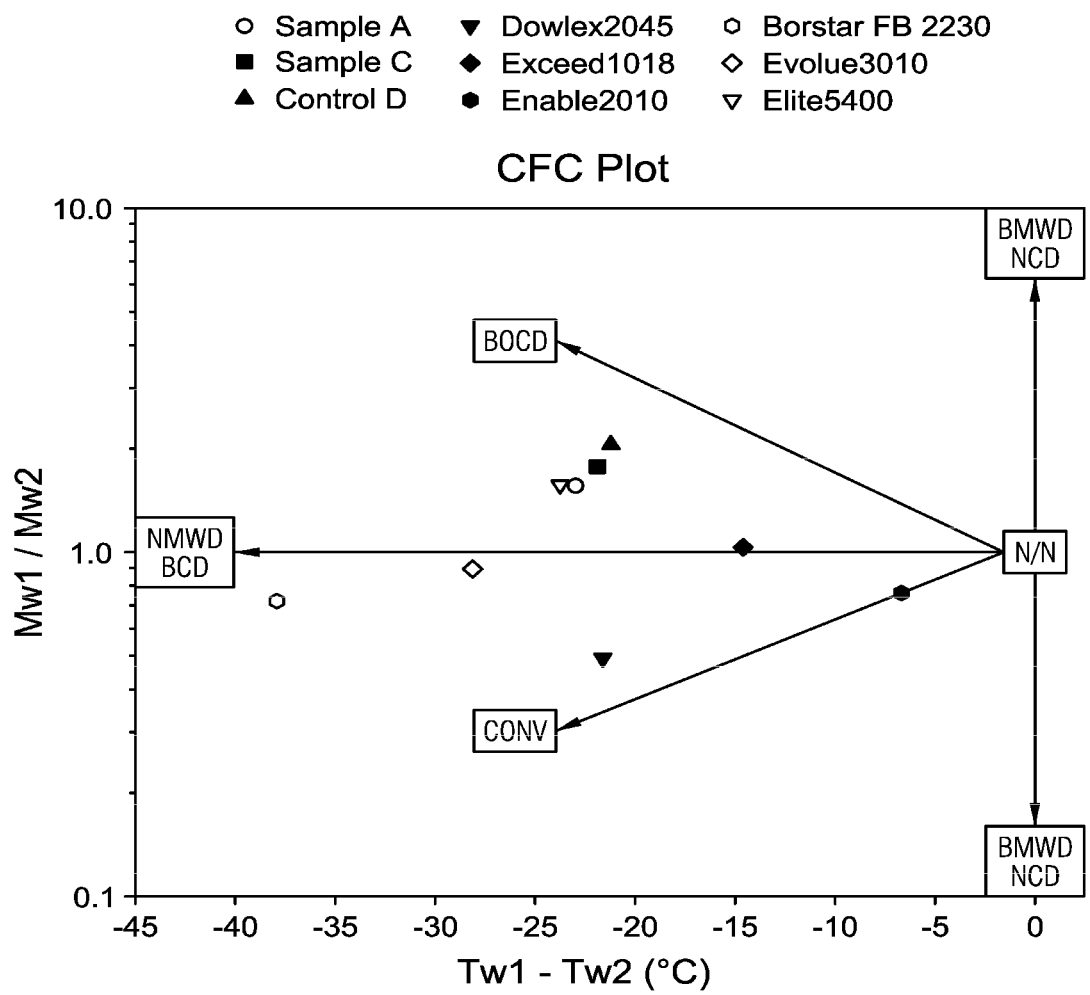
FIG. 2 is a plot showing important differences in MWD/SCBD combinations of polyethylene compositions.

With reference to FIG. 2, the x-axis represents the value of the difference between the first and second weight average elution temperatures ($Tw_1-Tw_2$), and the y-axis in a log scale represents the ratio of the first weight average molecular weight to the second weight average molecular weight ($Mw_1/Mw_2$). Shown is a semi-log plot of ($Mw_1/Mw_2$) vs. ($Tw_1-Tw_2$), which is designed to show the important differences in MWD/SCBD combination among inventive examples (polymers A and C, as well as Control B) versus commercial benchmarks. These differences are believed to play a key role in determining the trade-off pattern and/or balance of various performance attributes such as stiffness, toughness and processability.

Blown Film Evaluations

Blown films were extruded on a 2.5 inch Battenfield Gloucester Line (30:1 L:D) equipped with a 6 inch oscillating die. Output rate was 188 lb/hr (10 lb/hr/in die circumference) and the die gap was 60 mil. The target film gauge was 1 mil and the BUR ratio was held constant at 2.5. FLH was typically 19-24 inch. A standard "hump" temperature profile was used where "BZ" is barrel zone: BZ1=310/BZ2=410/BZ3=380/BZ4=350/BZ5=350/Adapter=390/Die=390 F. Further process data is found in Table V, which includes film properties at 1.0 mil gauge.

TDA is the total defect area, which is a measure of defects in a film specimen and is reported as the accumulated area of defects in square millimeters ($mm^2$) normalized by the area of film in square meters ($m^2$) examined, thus having a unit of ($mm^2/m^2$) or "ppm". Only defects with a dimension above 200 microns are reported in Table V. TDA is obtained by an Optical Control System (OCS). This system includes a small extruder (ME20 2800), cast film die, chill roll unit (Model CR-9), a winding system with good film tension control, and an on-line camera system (Model FSA-100) to examine the cast film generated for optical defects. The typical testing condition for the cast film generation includes an extruder zone temperature setting of 154-210° C.; a feed throat/Zone 1/Zone 2/Zone 3/Zone4/Die of 70/190/200/210/215/215; an extruder speed of 50 rpm; a chill roll temperature of 30° C.; and a chill roll speed of 3.5 m/min. The system generates a cast film of about 4.9 inch in width and a nominal gauge of 2 mil. Melt temperature varies with materials, and is typically around 215° C.

ESO is the energy specific extrusion output (lb/hr) in film extrusion normalized by the extruder power (hp) consumption and is a measure of a material's processability.

TABLE V

| bPE | Inventive A | Inventive B | Inventive C | Control D |
|---|---|---|---|---|
| Lay Flat (in) | 23.5 | 23.5 | 23.5 | 23.5 |
| Extruder Zone Temp Settings (° F.) | 310, 410, 380, 350, 350 | 310, 410, 380, 350, 350 | 310, 410, 380, 350, 350 | — |
| Die/Adap (° F.) | 390 | 390 | 390 | 397 |
| Melt Temperature (° F.) | 410 | 405 | 412 | 397.5 |
| Air Ring, ° F. | 69.1 | 64.7 | 82.6 | 51.8 |
| Press. (in water) | 4.5 | 4.0 | 6.5 | 4 |
| FLH (in) | 27 | 23 | 18 | 21 |
| Line Speed (fpm) | 165 | 165 | 168 | 168 |
| RPM | 94 | 87 | 61 | 61 |
| Rates: | | | | |
| lb/hr | 187 | 189 | 188 | 190 |
| lb/hr/RPM | 1.99 | 2.04 | 3.09 | 3.11 |
| lb/in die | 9.91 | 9.49 | 9.92 | 10.06 |
| Head Pressure (psi) | 3150 | 2860 | 4580 | 3850 |
| % motor load | 39 | 37.1 | 66.8 | 61 |
| Horsepower | 19 | 17 | 21 | 20 |
| Torque (HP/RPM) | 0.207 | 0.196 | 0.354 | 0.323 |
| ESO (lb/HP/hr) | 9.66 | 10.43 | 8.77 | 9.65 |

The physical properties of the films were tested using the techniques and methodologies described above. In particular, Dart F50, or Dart Drop Impact or Dart Impact (DI), was tested pursuant to ASTM D-1709, method A, using a dart with a phenolic composite head. Puncture resistance was determined according to a modified ASTM D 5748 test using two 0.25 mil HDPE slip sheets, and a United SFM-1 testing machine operating at 10 in/min. Haze was tested in accordance with ASTM D 1003. Gloss at 45° was determined in accordance with ASTM D 2457. And tear resistance was determined according to Elmendorf Tear pursuant to ASTM D 1922 with samples conditioned at 23°±2° C. and 50±10% relative humidity for 40 hours prior to testing. The results of the testing is provided in Table VI below.

TABLE VI

| Polymer Product | Inventive A | Inventive B | Inventive C | Control D |
|---|---|---|---|---|
| 12 (g/10 min) | 0.98 | 1.15 | 0.72 | 1.02 |
| 121 (g/10 min) | 22.6 | 28.74 | 16.15 | 23.3 |
| MIR | 23.0 | 24.88 | 22.56 | 22.4 |
| Density (g/cm3) | 0.9178 | 0.9180 | 0.9175 | 0.9180 |
| Gauge Mic (mils) | | | | |
| Average | 1.0 | 0.95 | 1.01 | 0.98 |
| 1% Secant (psi) | | | | |
| MD | 28631 | 32548 | 29928 | 26083 |
| TD | 32781 | 37686 | 36681 | 31354 |
| Tensile Yield Strength (psi) | | | | |
| MD | 1460 | 1524 | 1439 | 1412 |
| TD | 1570 | 1557 | 1596 | 1395 |
| Tensile Strength (psi) | | | | |
| MD | 8642 | 8645 | 9109 | 7604 |
| TD | 8099 | 7953 | 8857 | 7427 |
| Elmendorf Tear | | | | |
| MD (g) | 294 | 239 | 306 | 264 |
| TD (g) | 537 | 470 | 519 | 473 |
| MD (g/mil) | 285 | 246 | 303 | 272 |
| TD (g/mil) | 522 | 511 | 519 | 482 |
| Haze (%) | 14.8 | 16.7 | 11.6 | 19 |
| Haze-internal (%) | 3.0 | 3.03 | 2.36 | 2.4 |
| Gloss | | | | |
| MD | 7 | 7 | 12 | 37 |
| TD | 7 | 8 | 13 | 34 |

TABLE VI-continued

| Polymer Product | Inventive A | Inventive B | Inventive C | Control D |
|---|---|---|---|---|
| Dart Drop Method A | | | | |
| (g) | 866 | 686 | 890 | 590 |
| (g/mil) | 866 | 722 | 881 | 602 |

TABLE VI-continued

| Polymer Product | Inventive A | Inventive B | Inventive C | Control D |
|---|---|---|---|---|
| Puncture (Btec probe, B) | | | | |
| Break Energy (in-lbs/mil) | 35.45 | 31.03 | 37.02 | 32.17 |

FIG. 3 shows the average MD/TD film modulus as a function of resin density for the samples. Within FIG. 3, the dashed line represents a linear regression of the modulus dependence on resin density for two commercially-available resins, which were obtained under the tradenames Exceed 1018 and Exceed 1327 (ExxonMobil). The equation, Average Modulus=C1*Density−C2, shows the film modulus dependence of the commercially-available polyethylene compositions as a function of resin density. C1 is the slope of the linear regression of the modulus dependence on resin density of these polyethylene resins, and C2 is the intercept of this linear regression. As shown in FIG. 3, Inventive A, B, and C exhibited a substantial advantage in film stiffness at a given resin density when compared to the commercially-available polyethylene compositions, as well as Control D.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "I" preceding the recitation of the composition, element, or elements and vice versa, e.g., the terms "comprising," "consisting essentially of," "consisting of" also include the product of the combinations of elements listed after the term.

What is claimed is:

1. A polyethylene composition comprising:
   from about 80 wt % to about 99.5 wt % ethylene-derived units; and
   from about 0.5 to about 20 wt % of alpha-olefin derived units other than ethylene-derived units;
   wherein the composition has total internal unsaturations (Vy1+Vy2+T1) of from about 0.10 to about 0.40 per 1000 carbon atoms, an MI of from about 0.1 to about 6 g/10 min, an HLMI of from about 5.0 to about 40 g/10 min, a density of from about 0.890 to about 0.940 g/ml, a $Tw_1$-$Tw_2$ value of from about −25 to about −20° C., an $Mw_1$/$Mw_2$ value of from about 1.2 to about 2.0, an Mw/Mn of from about 4.5 to about 12, an Mz/Mw of from about 2.0 to about 3.0, an Mz/Mn of from about 7.0 to about 20, and a $g'_{(vis)}$ greater than 0.90.

2. The polyethylene composition of claim 1, where said polyethylene composition has a density of from about 0.912 to about 0.917 g/ml.

3. The polyethylene composition of claim 1, wherein the polyethylene composition has an MIR, defined as the ratio of high load melt index (HLMI, determined per ASTM D1238, 190° C., 21.6 kg load)) to melt index (MI, determined per ASTM D1238, 190° C., 2.16 kg load), of from about 20 to about 40 and an HLMI of from about 7.0 to about 35 g/10 min.

4. The polyethylene composition of claim 1, wherein the polyethylene composition has a $Tw_1$-$Tw_2$ value of from about −24 to about −20.5° C., an $Mw_1$/$Mw_2$ value of from about 1.35 to about 1.85, an Mw/Mn of from about 4.7 to about 12, an Mz/Mw of from about 2.2 to about 2.9, an Mz/Mn of from about 10 to about 18, and a $g'_{(vis)}$ greater than 0.92.

5. The polyethylene composition of claim 1, wherein the polyethylene composition has a $Tw_1$-$Tw_2$ value of from about −23 to about −21° C., an $Mw_1$/$Mw_2$ value of from about 1.5 to about 1.8, an Mw/Mn of from about 4.4 to about 9.5, an Mz/Mw of from about 2.3 to about 2.8, an Mz/Mn of from about 11 to about 17, and a $g'_{(vis)}$ greater than 0.94.

6. The polyethylene composition of claim 1 any of claims 1 to 5, wherein the polyethylene composition has tri-substituted olefins (T1) of from about 0.08 to about 0.35 per 1000 carbon atoms.

7. The polyethylene composition of claim 1 any of claims 1 to 6, wherein the polyethylene composition has internal unsaturations without carbon substitutions (Vy1+Vy2) of from about 0.02 to about 0.1 per 1000 carbon atoms.

8. The polyethylene composition of claim 7, where said polyethylene composition is characterized by internal unsaturations without carbon substitutions (Vy1+Vy2) of from about 0.04 to about 0.08 per 1000 carbon atoms.

9. A blown polyethylene film comprising:
   a polyethylene composition comprising from about 0.5 to about 20 wt % of alpha-olefin derived units other than ethylene-derived units, with the balance including ethylene-derived units, total internal unsaturations (Vy1+Vy2+T1) of from about 0.10 to about 0.40 per 1000 carbon atoms, an MI of from about 0.1 to about 6 g/10 min, an HLMI of from about 5.0 to about 40 g/10 min, a density of from about 0.890 to about 0.940 g/ml, a $Tw_1$-$Tw_2$ value of from about −25 to about −20° C., an $Mw_1$/$Mw_2$ value of from about 1.2 to about 2.0, an Mw/Mn of from about 4.5 to about 12, an Mz/Mw of from about 2.0 to about 3.0, an Mz/Mn of from about 7.0 to about 20, and a $g'_{(vis)}$ greater than 0.90;
   wherein the blown film has a Dart Drop Impact (DI) that is greater than 300 g/mil, a haze of less than 30%, and a machine-direction tear resistance that is greater than 120 g/mil.

10. The blown film of claim 9, wherein the blown film has a Dart Drop Impact (DI) that is greater than 400 g/mil, a haze of less than 20%, and a machine-direction tear resistance that is greater than 130 g/mil.

11. The blown film of claim 9, wherein the polyethylene composition has a density of from 0.914 to 0.917 g/ml, and where the film has a 1% secant modulus, in the transverse direction, of greater than 30,000 psi.

12. The blown film of claim 11, wherein the polyethylene composition has a density of from 0.914 to 0.917 g/ml, and where the film has a 1% secant modulus, in the transverse direction, of greater than 32,000 psi.

13. The blown film of claim 9, wherein the polyethylene composition has a density of from about 0.918 to about 0.921 g/ml, and where the film has a 1% secant modulus, in the transverse direction, of greater than 42,000 psi.

14. The blown film of claim 13, wherein the polyethylene composition has a density of from about 0.918 to about 0.921 g/ml, and where the film has a 1% secant modulus, in the transverse direction, of greater than 45,000 psi.

15. The blown film of claim 9, wherein the polyethylene composition has a density from about 0.912 to about 0.917 g/ml.

16. The blown film of claim 9, wherein the polyethylene composition has an MIR, defined as the ratio of high load melt index (HLMI, determined per ASTM D1238, 190° C., 21.6 kg load) to melt index (MI, determined per ASTM D1238, 190° C., 2.16 kg load), of from about 20 to about 40 and an HLMI of from about 7.0 to about 35 g/10 min.

17. The blown film of claim 9, wherein the polyethylene composition has a $Tw_1$-$Tw_2$ value of from about −24 to about −20.5° C., an $Mw_1/Mw_2$ value of from about 1.35 to about 1.85, an Mw/Mn of from about 4.7 to about 12, an Mz/Mw of from about 2.2 to about 2.9, an Mz/Mn of from about 10 to about 18, and a $g'_{(vis)}$ greater than 0.92.

18. The blown film of claim 9, wherein the polyethylene composition has a $Tw_1$-$Tw_2$ value of from about −23 to about −21° C., an $Mw_1/Mw_2$ value of from about 1.5 to about 1.8, an Mw/Mn of from about 4.9 to about 9.5, an Mz/Mw of from about 2.3 to about 2.8, an Mz/Mn of from about 11 to about 17, and a $g'_{(vis)}$ greater than 0.94.

19. The blown film of claim 9, wherein the polyethylene composition has tri-substituted olefins (T1) of from about 0.08 to about 0.35 per 1000 carbon atoms.

20. The blown film of claim 9, wherein the polyethylene composition has internal unsaturations without carbon substitutions (Vy1+Vy2) of from about 0.02 to about 0.1 per 1000 carbon atoms.

21. The blown film of claim 20, wherein the polyethylene composition has internal unsaturations without carbon substitutions (Vy1+Vy2) of from about 0.04 to about 0.08 per 1000 carbon atoms.

22. The blown film of claim 9, where the polyethylene composition is prepared by combining a catalyst system with ethylene and an alpha-olefin comonomer other than ethylene, where the catalyst system includes (i) an unbridged hafnium metallocene compound; (ii) an unbridged zirconium metallocene compound; (iii) a support material; and (iv) activator.

23. The blown film of claim 22, where the catalyst system includes an unbridged bis-cyclopentadienyl hafnium catalyst, an unbridged bis-cyclopentadienyl zirconium catalyst, and an activator, with ethylene and within the range from 0.1 to 5 wt % relative to the weight of all monomers of a C3 to C12 α-olefin at a temperature within the range from 60 to 100° C., wherein the unbridged zirconium metallocene is represented by the following formula (A):

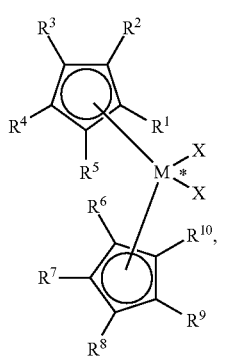

(A)

where M* is hafnium; each of $R^1$, $R^2$, $R^4$ and $R^5$ is independently hydrogen, alkoxide, or $C_1$ to $C_{40}$ substituted or unsubstituted hydrocarbyl; $R^3$ is —$R^{11}$—$SiR'_3$, where $R^{11}$ is a $C_1$ to $C_4$ hydrocarbyl, and each R' is independently hydrogen or a $C_1$ to $C_{20}$ substituted or unsubstituted hydrocarbyl; each $R^6$, $R^7$, $R^8$, $R^9$, and $R^{10}$ is independently hydrogen, halide, alkoxide, $C_1$ to $C_{40}$ substituted or unsubstituted hydrocarbyl, or —$R^{11}$—$SiR'_3$, where $R^{11}$ is a $C_1$ to $C_4$ hydrocarbyl, and each R' is independently hydrogen or a $C_1$ to $C_{20}$ substituted or unsubstituted hydrocarbyl; and each X is independently a univalent anionic ligand, or two Xs are joined to form a metallocyclic ring, or two Xs are joined to form a chelating ligand, a diene ligand, or an alkylidene ligand.

24. The blown film of claim 23, where $R^3$ and $R^9$ are both, independently, —$R^{11}$—$SiR'_3$, where $R^{11}$ is a $C_1$ to $C_4$ hydrocarbyl, and each R' is independently $C_1$ to $C_{20}$ substituted or unsubstituted hydrocarbyl.

25. The blown film of claim 22, where the unbridged zirconium metallocene compound is one or more of: Cp(Ind)ZrCl$_2$, Me$_5$Cp(Ind)ZrCl$_2$, Et$_5$Cp(Ind)ZrCl$_2$, n-Pr$_5$Cp(Ind)ZrCl$_2$, n-Bu$_5$Cp(Ind)ZrCl$_2$, Bz$_5$Cp(Ind)ZrClz, Cp(1-Me Ind)ZrCl$_2$, Cp(1-Et Ind)ZrCl$_2$, Cp(1-n-Pr Ind)ZrCl$_2$, Cp(1-n-Bu Ind)ZrCl$_2$, Cp(1-n-Pn Ind)ZrCl$_2$, Cp(1-n-hx Ind)ZrCl$_2$, Cp(1-Bz Ind)ZrCl$_2$, Cp(1-Me$_3$SiCH$_2$ Ind)ZrCl$_2$, Me$_5$Cp(1-Me Ind)ZrCl$_2$, Me$_5$Cp(1-Et Ind)ZrCl$_2$, Me$_5$Cp(1-n-Pr Ind)ZrCl$_2$, Me$_5$Cp(1-n-Bu Ind)ZrCl$_2$, Me$_5$Cp(1-n-Pn Ind)ZrCl$_2$, Me$_5$Cp(1-n-hx Ind)ZrCl$_2$, Me$_5$Cp(1-Bz Ind)ZrCl$_2$, Me$_5$Cp(1-Me$_3$SiCH$_2$ Ind)ZrCl$_2$, Et$_5$Cp(1-Me Ind)ZrCl$_2$, Et$_5$Cp(1-Et Ind)ZrCl$_2$, Et$_5$Cp(1-n-Pr Ind)ZrCl$_2$, Et$_5$Cp(1-n-Bu Ind)ZrCl$_2$, Et$_5$Cp(1-n-Pn Ind)ZrCl$_2$, Et$_5$Cp(1-n-hx Ind)ZrCl$_2$, Et$_5$Cp(1-Bz Ind)ZrCl$_2$, Et$_5$Cp(1-Me$_3$SiCH$_2$ Ind)ZrCl$_2$, n-Pr$_5$Cp(1-Me Ind)ZrCl$_2$, n-Pr$_5$Cp(1-Et Ind)ZrCl$_2$, n-Pr$_5$Cp(1-n-Pr Ind)ZrCl$_2$, n-Pr$_5$Cp(1-n-Bu Ind)ZrCl$_2$, n-Pr$_5$Cp(1-n-Pn Ind)ZrCl$_2$, n-Pr$_5$Cp(1-n-hx Ind)ZrCl$_2$, n-Pr$_5$Cp(1-Bz Ind)ZrCl$_2$, n-Pr$_5$Cp(1-Me$_3$SiCH$_2$ Ind)ZrCl$_2$, n-Bu$_5$CP(1-Me Ind)ZrCl$_2$, n-Bu$_5$Cp(1-Et Ind)ZrCl$_2$, n-Bu$_5$Cp(1-n-Pr Ind)ZrCl$_2$, n-Bu$_5$Cp(1-n-Bu Ind)ZrCl$_2$, n-Bu$_5$Cp(1-n-Pn Ind)ZrCl$_2$, n-Bu$_5$Cp(1-n-hx Ind)ZrCl$_2$, n-Bu$_5$Cp(1-Bz Ind)ZrCl$_2$, n-Bu$_5$Cp(1-Me$_3$SiCH$_2$ Ind)ZrCl$_2$, Bz$_5$Cp(1-Me Ind)ZrCl$_2$, Bz$_5$Cp(1-Et Ind)ZrCl$_2$, Bz$_5$Cp(1-n-Pr Ind)ZrCl$_2$, Bz$_5$Cp(1-n-Bu Ind)ZrCl$_2$, Bz$_5$Cp(1-n-Pn Ind)ZrCl$_2$, Bz$_5$Cp(1-n-hx Ind)ZrCl$_2$, Bz$_5$Cp(1-Bz Ind)ZrCl$_2$, Bz$_5$Cp(1-Me$_3$SiCH$_2$ Ind)ZrCl$_2$, and the alkyl or halide versions thereof where the Cl$_2$ is substituted with Bz$_2$, Et$_2$, Me$_2$, Br$_2$, I$_2$, or Ph$_2$; and wherein the unbridled hafnium metallocene compound generates hydrogen.

* * * * *